United States Patent
Satoyama et al.

(10) Patent No.: US 9,898,221 B2
(45) Date of Patent: Feb. 20, 2018

(54) CONTROL DEVICE FOR STORAGE SYSTEM CAPABLE OF ACTING AS A CONSTITUENT ELEMENT OF VIRTUALIZATION STORAGE SYSTEM

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1029 days.

(21) Appl. No.: 12/858,570

(22) Filed: Aug. 18, 2010

(65) Prior Publication Data

US 2010/0318579 A1 Dec. 16, 2010

Related U.S. Application Data

(63) Continuation of application No. 11/529,053, filed on Sep. 27, 2006, now abandoned.

(30) Foreign Application Priority Data

Aug. 2, 2006 (JP) .................................. 2006-210464

(51) Int. Cl.
*G06F 7/00* (2006.01)
*G06F 3/06* (2006.01)
*G06F 17/30* (2006.01)

(52) U.S. Cl.
CPC ............ *G06F 3/0635* (2013.01); *G06F 3/067* (2013.01); *G06F 3/0617* (2013.01); *G06F 3/0662* (2013.01); *G06F 17/30067* (2013.01)

(58) Field of Classification Search
CPC .............................................. G06F 17/30067
USPC ............ 707/999.101, 999.102, 659; 711/100
See application file for complete search history.

(56) References Cited

U.S. PATENT DOCUMENTS

| | | | |
|---|---|---|---|
| 6,185,580 B1* | 2/2001 | Day, III | G06F 3/0607 |
| 6,345,368 B1* | 2/2002 | Bergsten | G06F 3/0619 |
| | | | 707/999.202 |
| 6,360,306 B1* | 3/2002 | Bergsten | G06F 3/0619 |
| | | | 707/999.202 |
| 6,393,432 B1 | 5/2002 | Flansburg et al. | |
| 6,640,278 B1 | 10/2003 | Nolan et al. | |
| 6,732,104 B1* | 5/2004 | Weber | G06F 3/0605 |
| 6,839,706 B2* | 1/2005 | Spiers | H04L 49/90 |
| | | | 707/999.001 |
| 6,883,083 B1 | 4/2005 | Kemkar | |
| 7,007,152 B2 | 2/2006 | Pesola et al. | |

(Continued)

FOREIGN PATENT DOCUMENTS

| | | |
|---|---|---|
| JP | 2000-099278 A | 4/2000 |
| JP | 2004-013215 A | 1/2004 |

(Continued)

OTHER PUBLICATIONS

Japan Patent Office office action for patent application JP JP2006-210464 (Jun. 7, 2011).

*Primary Examiner* — Eliyah S Harper
(74) *Attorney, Agent, or Firm* — Mattingly & Malur, PC

(57) ABSTRACT

A management target constituting the target of processing executed by a first storage system in accordance with a request transmitted from a higher-level device is managed by first and second management identifiers. A request designating the first management identifier is received from the higher-level device, and a first management identifier designated by the request is converted into a corresponding second management identifier.

14 Claims, 17 Drawing Sheets

(56) References Cited

U.S. PATENT DOCUMENTS

| | | | |
|---|---|---|---|
| 7,171,434 B2* | 1/2007 | Ibrahim | G06F 3/0617 |
| 7,191,251 B2* | 3/2007 | Watanabe et al. | 709/245 |
| 7,360,030 B1* | 4/2008 | Georgiev | 711/141 |
| 7,542,999 B2* | 6/2009 | Kamath et al. | |
| 7,620,981 B2* | 11/2009 | Frank | H04L 29/12009 |
| | | | 707/999.202 |
| 7,673,110 B2 | 3/2010 | Yamamoto et al. | |
| 7,953,942 B2 | 5/2011 | Innan et al. | |
| 2002/0188592 A1* | 12/2002 | Leonhardt | G06F 17/3051 |
| 2003/0172149 A1 | 9/2003 | Edsall et al. | |
| 2003/0204597 A1* | 10/2003 | Arakawa et al. | 709/226 |
| 2003/0208462 A1* | 11/2003 | Pocock | G06F 3/0601 |
| 2003/0225861 A1 | 12/2003 | Iwamura et al. | |
| 2004/0103261 A1 | 5/2004 | Honda et al. | |
| 2004/0250021 A1* | 12/2004 | Honda et al. | G06F 3/0605 |
| | | | 711/114 |
| 2005/0060316 A1* | 3/2005 | Kamath | G06F 17/30067 |
| 2005/0071559 A1 | 3/2005 | Tamura et al. | |
| 2005/0114350 A1* | 5/2005 | Rose | G06F 3/0613 |
| 2006/0047909 A1 | 3/2006 | Takahashi et al. | |
| 2006/0101221 A1 | 5/2006 | Harada | |
| 2006/0242363 A1 | 10/2006 | Tamura et al. | |
| 2006/0242377 A1 | 10/2006 | Kanie et al. | |
| 2006/0253549 A1* | 11/2006 | Arakawa et al. | 709/217 |
| 2007/0245106 A1 | 10/2007 | Maki et al. | |
| 2008/0010234 A1 | 1/2008 | Nakagawa et al. | |

FOREIGN PATENT DOCUMENTS

| | | |
|---|---|---|
| JP | 2005-107645 A | 4/2005 |
| JP | 2005-301561 A | 10/2005 |

\* cited by examiner

| GLOBAL LDEV NUMBER | LOCAL LDEV NUMBER |
|---|---|
| 0 | 0 |
| 1 | 1 |
| ... | ... |
|  |  |

| GLOBAL LDEV NUMBER | LOCAL LDEV NUMBER |
|---|---|
| 64 | 0 |
| 65 | 1 |
| 66 | 2 |
| ... | ... |

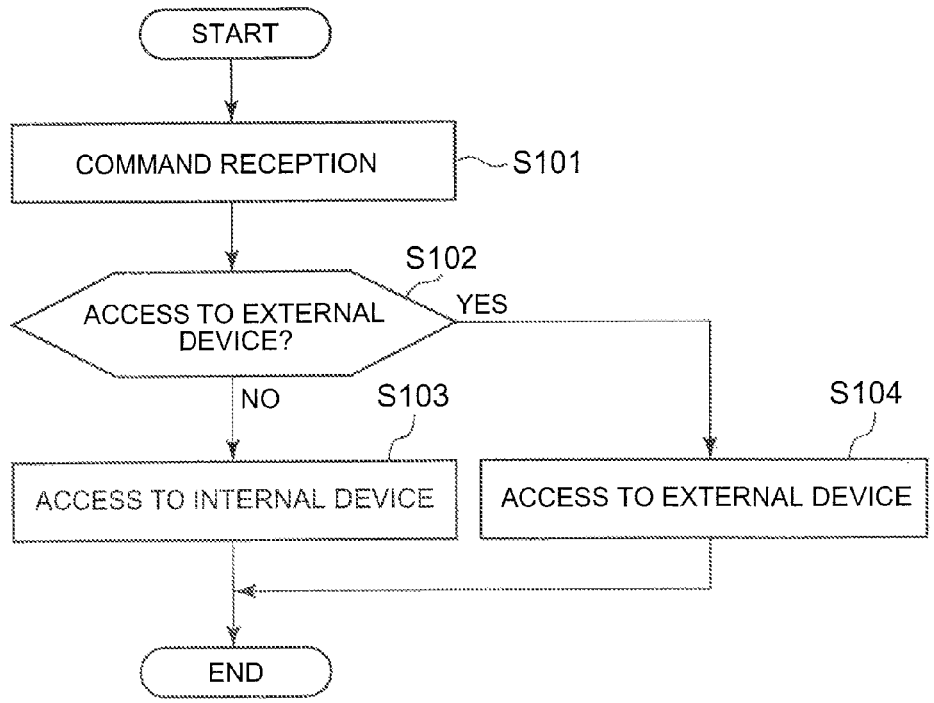

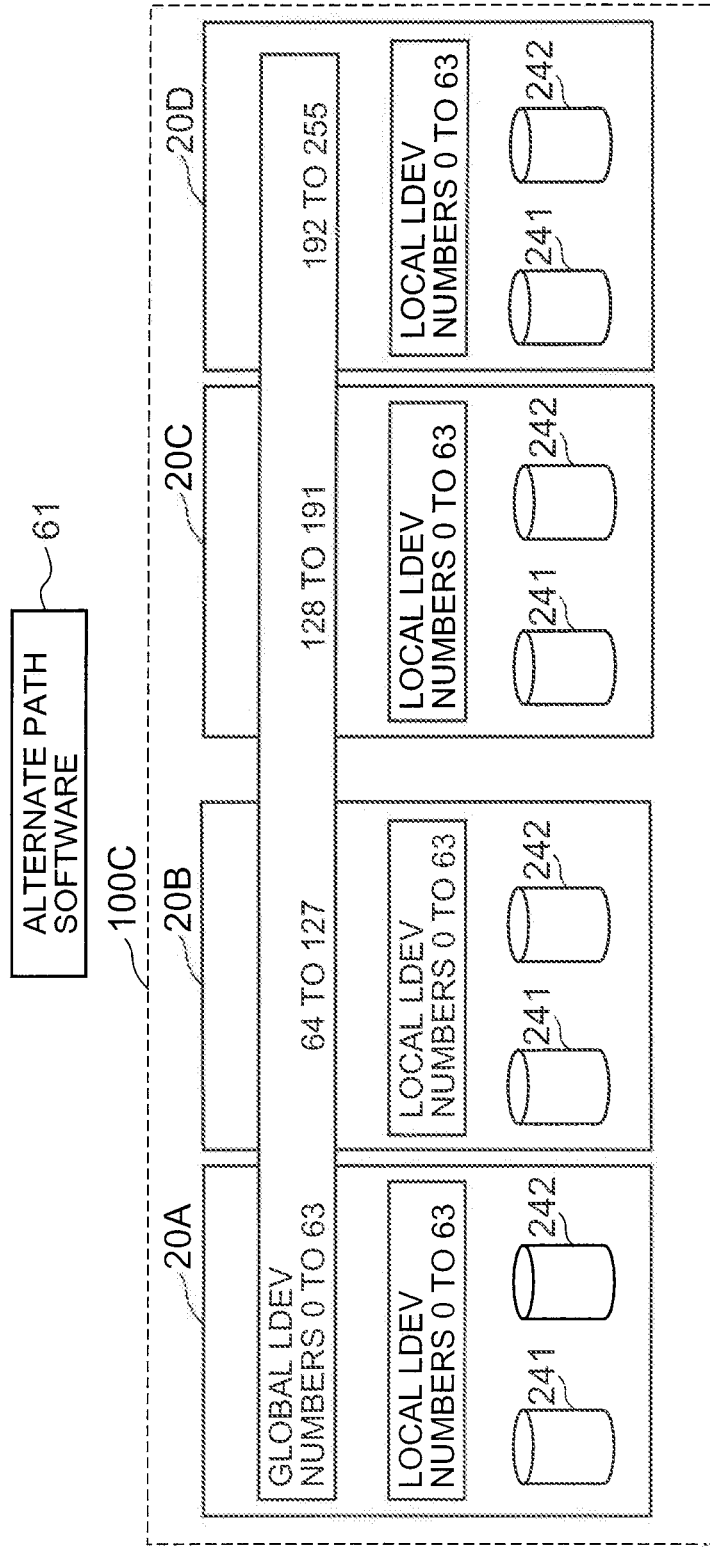

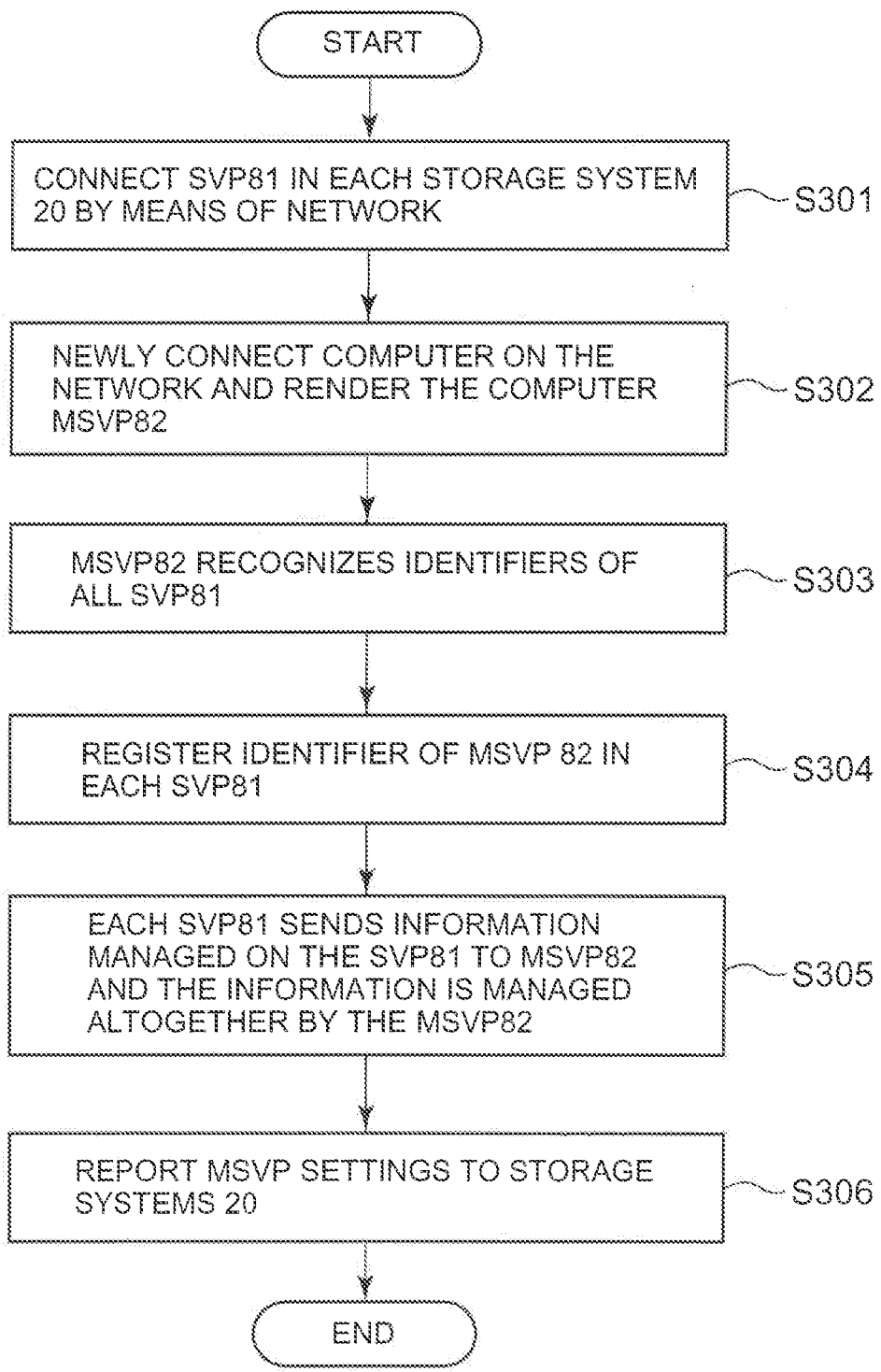

FIG. 13

| | 953 |
|---|---|
| VIRTUAL STORAGE SYSTEM CONSTITUTION INFORMATION | 100A |
| STORAGE SYSTEM INFORMATION | 20A, 20B |
| MSVP NUMBER | S20A |
| SVP NUMBER LIST | S20A, S20B |

FIG. 14

| | 955 |
|---|---|
| VIRTUAL STORAGE SYSTEM NUMBER LIST | 100A 100B |

| GLOBAL LDEV NUMBER | 1 |
|---|---|
| INITIAL ACTIVE STORAGE SYSTEM NUMBER | 20A |
| CURRENT ACTIVE STORAGE SYSTEM NUMBER | 20B |
| CURRENT PASSIVE STORAGE SYSTEM NUMBER | 20A |
| FAIL-OVER EXISTENCE: | YES |
| STATE (DURING MIGRATION/NORMAL) | MIGRATION IN PROGRESS |

| GLOBAL LDEV NUMBER | — |
|---|---|
| INITIAL ACTIVE STORAGE SYSTEM NUMBER | — |
| CURRENT ACTIVE STORAGE SYSTEM NUMBER | — |
| CURRENT PASSIVE STORAGE SYSTEM NUMBER | — |
| FAIL-OVER EXISTENCE: | — |
| STATE (DURING MIGRATION/NORMAL) | — |

CONTROL DEVICE FOR STORAGE SYSTEM CAPABLE OF ACTING AS A CONSTITUENT ELEMENT OF VIRTUALIZATION STORAGE SYSTEM

CROSS-REFERENCE TO RELATED APPLICATION(S)

This application is a continuation application of U.S. patent application Ser. No. 11/529,053, filed on Sep. 26, 2006, which claims priority from Japanese Patent Application No. 2006-210464 filed on Aug. 2, 2006, the disclosures of which are incorporated herein by reference in their entirety for all purposes.

FIELD OF THE INVENTION

The present invention relates to a virtual storage system that virtualizes a plurality of storage systems logically as one storage resource.

DESCRIPTION OF THE RELATED ART

In the storage field, for example, a plurality of computing resources distributed over a network are operated as if these computing resources were one computing resource and there has been a focus on 'storage grids (wide bandwidth common file system)' which increase the processing performance and fault tolerance and so forth. As a method of operating a storage grid, a method that virtualizes a plurality of storage systems logically as one storage resource is known.

Further, as a technology for virtualizing volumes, a technology that manages logical units of a second storage system that exists outside a first storage system within the first storage system is known (Japanese patent application laid open no. 2005-107645, for example).

As a method for constructing a storage grid, construction that involves assembling a plurality of storage systems that operate as a single storage system, for example, may be considered. A case where two storage systems a and b are a storage grid may be considered as a specific example.

Put simply, when a single system is virtually constructed by eliminating the boundary between these storage systems a and b, the numbers of the logical storage devices (also called logical volumes and abbreviated to 'LDEV' hereinbelow) (may be another identifier instead of a number) are associated with the storage systems a and b respectively. Hence, there may be the problem that a plurality of LDEVs with the same LDEV number are present. This can occur not only with LDEV numbers but also with management identifiers of different types. For example, the same problem can also occur with copy system control information such as pair numbers and group numbers and so forth, for example (the numbers of groups consisting of a plurality of pairs). Hence, it is difficult to smoothly establish storage systems that are operating individually as the constituent elements of a virtual storage system.

In addition, the storage systems a and b sometimes each comprise at least one management server ('SVP' (service processor) hereinbelow). An SVP receives an instruction to input information to a management-target storage system, outputs the information, and holds management information for the storage system, for example. When a virtual storage system is constructed with storage systems a and b forming the storage grid and information managed by the SVP of storage system a is obtained by storage system b, then storage system b must issue an inquiry to the SVP of storage system a. Hence, whenever the storage system b acquires management information from the SVP of the storage system a, the storage system b issues an inquiry to the SVP, the processing grows complex and the load increases.

SUMMARY OF THE INVENTION

Therefore, an object of the present invention is to make it possible to smoothly establish storage systems that operate individually as the constituent elements of a virtual storage system.

A further object of the present invention is to provide a new management method that is completed without the respective storage systems of the virtual storage system seeking management information from the management servers of the other storage systems.

Further objects of the present invention will become evident from the subsequently description.

A control device according to a first aspect of the present invention is a control device for managing a management target constituting the target of processing executed by a first storage system in accordance with a request transmitted from a higher-level device and for controlling the operation of the first storage system. The control device comprises an identifier correspondence storage section for storing identifier correspondence information that records first and second management identifiers for each of a plurality of management targets; a reception section for receiving a request designating the first management identifier from the higher-level device; a correspondence specification section for specifying the second management identifier that corresponds with the first management identifier designated by the received request from the identifier correspondence information; and an output section for outputting the specified second management identifier to the processing section of the first storage system. The second management identifier is a management identifier of a type that is used for the processing by the first storage system. The processing section of the first storage system is able to identify the processing target from the second management identifier thus output. The first management identifier is a management identifier of a type that is recognized by the higher-level device and which is changed to a value that does not overlap the first management identifier of the management target of another storage system of a virtual storage system obtained by logically virtualizing a plurality of storage systems as one storage resource when the first storage system is a constituent element of the virtual storage system.

The control device may be installed in the first storage system or may be a separate device from the first storage system.

In the first embodiment of the control device, the first and second management identifiers are an identifier for identifying each of a plurality of logical storage devices that exist in the first storage system and/or an identifier for identifying each of a plurality of specified resources. A specified resource can be a pair for copying from a logical storage device to another logical storage device, for example. The pair may be a single pair or a pair which is a constituent element of a pair group constituted by a plurality of pairs.

In a second embodiment of the control device, the control device further comprises a change section for changing the first management identifier in accordance with a change in the number of storage systems constituting the virtual storage system.

In a third embodiment of the control device, the control device is the control device according to the second embodiment, wherein the change in the number of storage systems involves adding the first storage system to an existing virtual storage system. The change section changes each of a plurality of first management identifiers that correspond with each of a plurality of management targets of the first storage system to values that do not overlap a plurality of first management identifiers of respective other storage systems of the existing virtual storage system.

In a fourth embodiment of the control device, the control device is the control device according to the second embodiment, wherein the change in the number of storage systems involves constructing a third virtual storage system by merging a second virtual storage system with the existing first virtual storage system containing the first storage system according to the second embodiment. The change section changes each of a plurality of first management identifiers that correspond with each of a plurality of management targets of the first storage system to values that do not overlap a plurality of first management identifiers of respective other storage systems of the third virtual storage system.

In a fifth embodiment of the control device, the control device is the control device according to the second embodiment, further comprising a change report section that reports the changed plurality of first management identifiers to the higher-level device.

In a sixth embodiment of the control device, the control device is the control device according to the second embodiment, wherein the change section changes the plurality of first management identifiers to the same values as the plurality of second management identifiers respectively when the first storage system is independent as a result of the first storage system being removed from the virtual storage system.

In a seventh embodiment of the control device, the control device is the control device according to the second embodiment, wherein each of the plurality of management targets is a logical storage device. The first and second storage systems constituting the virtual storage system are connected to an external storage system that does not constitute the virtual storage system and an intangible first virtual logical storage device of the first storage system and an intangible second virtual logical storage device of the second storage system are connected to a tangible external logical storage device of the external storage system. In this case, the change section affords the first management identifier of the first virtual logical storage device the same value as the first management identifier of the second virtual logical storage device.

The management method according to a second aspect of the present invention is a management method of a virtual storage system obtained by logically virtualizing a plurality of storage systems as one storage resource. This management method connects a plurality of management computers held by the plurality of storage systems by means of a network and collectively manages a plurality of management information items that are each managed by the plurality of management computers by means of one master management computer.

In a first embodiment of the management method, a management computer other than the plurality of management computers is connected to the network. The other management computer is rendered the master management computer and the plurality of management computers are rendered the slave management computers. The master management computer stores the respective identifiers of the plurality of slave management computers. Each of the plurality of slave management computers stores the identifiers of the master management computers. Each of the plurality of slave management computers transmits management information to the master management computer. The master management computer receives each of a plurality of management information items from the plurality of slave management computers and stores the plurality of management information items thus received in the storage resource of the master management computer.

In a second embodiment of the management method, one of the plurality of management computers is rendered the master management computer and the other management computers are rendered slave management computers. The master management computer stores the identifiers of the slave management computers. The slave management computers store the identifiers of the master management computer. The slave management computers transmit management information to the master management computer. The master management computer receives management information from the slave management computers and stores the management information thus received in the storage resource of the master management computer. The master management computer also stores management information for managing the storage system to which the master management computer is itself connected in the storage resource of the master management computer in addition to the management information of the slave management computers.

In a third embodiment of the management method, the master management computers are multiplexed and one of the multiplexed master management computers is rendered Active while the others are rendered Passive. When the Active master management computer is stopped, any of the Passive master management computers becomes Active and operates as the master management computer in place of the stopped master management computer.

In a fourth embodiment of the management method, the master management computer broadcasts a master identifier which is its own identifier to management computers other than itself. The management computers that receive the master identifier store the received master identifier in their own storage resource and, by way of response, transmit slave identifiers which are their own identifiers to the master management computer constituting the transmission origin of the master identifier. The master management computer receives the slave identifiers from management computers other than itself and store the slave identifiers thus received in its own storage resource.

A computer system according to a third aspect of the present invention comprises a control device for managing a management target constituting the target of processing executed by a first storage system in accordance with a request transmitted from a higher-level device and for controlling the operation of the first storage system; a virtual storage system obtained by logically virtualizing a plurality of storage systems including the first storage system as one storage resource; and a virtualization section for providing the virtual storage system as the one storage resource. The control device comprises an identifier correspondence storage section for storing identifier correspondence information that records first and second management identifiers for each of a plurality of management targets; a reception section for receiving a request designating the first management identifier from the higher-level device;

a correspondence specification section for specifying the second management identifier that corresponds with the first management identifier designated by the received request from the identifier correspondence information; and an output section for outputting the specified second management identifier to the processing section of the first storage system. The second management identifier is a management identifier of a type that is used for the processing by the first storage system and the processing section of the first storage system identifies the processing target from the second management identifier thus output. The first management identifier is a management identifier of a type that is recognized by the higher-level device and which is changed to a value that does not overlap the first management identifier of the management target of another storage system of a virtual storage system obtained by logically virtualizing a plurality of storage systems as one storage resource when the first storage system is a constituent element of the virtual storage system.

In a first embodiment of the computer system, the control device further comprises a change section that changes the first management identifier in accordance with a change in the number of storage systems constituting the virtual storage system; and a change report section that reports the changed plurality of first management identifiers to the virtualization section. The virtualization section manages the correspondence between a plurality of third management identifiers that can be designated by a host and the plurality of first management identifiers and, when the changed plurality of first management identifiers are received, changes the plurality of first management identifiers that correspond with each of the plurality of third management identifiers to the changed plurality of first management identifiers thus received.

In a second embodiment of the computer system, the higher-level device is a switch that is interposed between the host and the virtual storage system. The virtualization section is installed in the switch.

In a third embodiment of the computer system, the higher-level device is the host, and the virtualization section is installed in the host.

The storage section of the above control device or computer system can be constructed by a storage resource such as a memory, for example. Further, the other parts of the control device or computer system can be constructed by hardware, a computer program or a combination thereof (a portion is implemented by a computer program while the remainder is implemented by hardware, for example). The computer program is read to a predetermined processor and executed. Further, a storage area that exists in a hardware resource such as memory may be suitably used during information processing that is performed when a computer program is read to the processor. In addition, the computer program may be installed on a computer from a recording medium such as a CD-ROM or may be downloaded to the computer via a communication network.

BRIEF DESCRIPTION OF THE DRAWINGS

FIG. 4A shows an example of a number management table 105B in a storage system 20B that operates independently;

FIG. 4B shows the number management table 105 in the storage system 20B after the global LDEV numbers have been changed;

FIG. 5 shows a constitutional example of a device information table 106;

FIG. 6 shows the flow of processing that is performed when the storage system 20 receives an access request;

FIG. 8B shows the relationship between global LDEV numbers of a virtual storage system 100C constituted as a result of the other virtual storage system 100B merging with the virtual storage system 100A and local LDEV numbers;

FIG. 10 is a flowchart showing the procedure for performing SVP integrated management by means of the first method;

FIG. 13 shows virtual storage system management information;

FIG. 14 shows virtual storage system overall information;

FIG. 15A shows fail over management information for a failed over LDEV;

FIG. 15B shows fail over management information for an LDEV that has not been failed over;

DETAILED DESCRIPTION OF THE PREFERRED EMBODIMENT

An embodiment of the present invention will be described herein below.

Figure 1:
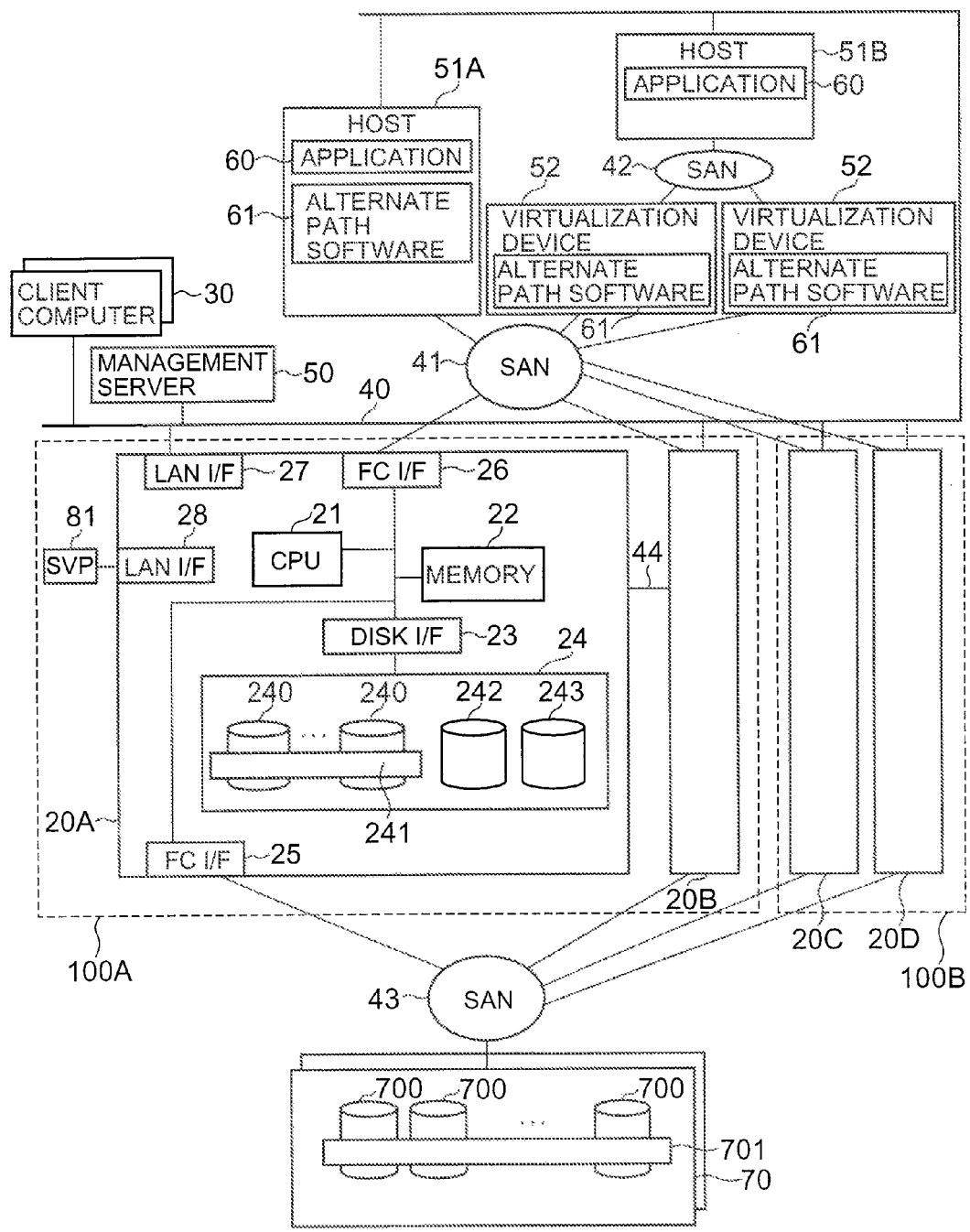
FIG. 1 shows a constitutional example of the whole system according to a first embodiment of the present invention.

FIG. 1 shows a constitutional example of the whole system according to a first embodiment of the present invention. In the following description, when elements of the same type are described without differentiation, the description is provided by using only parent numerals (100, for example) and, when elements of the same type are described with differentiation, the description is provided by using parent and child numerals (100a, 100b, for example).

The virtual storage system 100a comprises a plurality of storage systems 20a and 20b and the external storage system 70. similarly, the virtual storage system 100b comprises a plurality of storage systems 20c and 20d and the external storage system 70. The virtual storage system 100b, which has the same constitution as the virtual storage system 100a, may also be connected to a san41 in the same way.

The respective hosts 51 comprise a CPU and a storage resource (memory, for example) (not illustrated). A computer program is stored in the storage resource and the CPU is able to execute the computer program. When the computer program is the subject hereinbelow, in reality, processing is performed by the CPU that executes the computer program.

The host 51a is connected to the respective storage systems 20a and 20b. The host 51a is connected to the respective storage systems 20a and 20b via the san (storage area network) 41. The host 51a recognizes the plurality of storage systems 20a and 20b logically as one storage resource (virtual storage system) 100a by means of the functions of alternate path software 61.

Another host 51b that does not comprise alternate path software 61 is connected to the respective storage systems 20a and 20b via a san42, a virtualization device 52, and the san41. The host 51b recognizes the plurality of storage systems 20a and 20b as one virtual storage system 100a by means of the functions of the alternate path software 61 in the virtualization device 52.

The virtualization device 52 virtualizes the storage areas provided by each of the plurality of storage systems 20a and 20b into one logical storage area. The virtualization device 52 is a virtualization switch, intelligent switch, or virtualization-dedicated switch, or the like, for example. Further, a system constituting comprising a virtual storage system 100 and the virtualization device 52 is called a storage network system.

The respective hosts 51 comprise an application program 60. the application program 60 is a business program such as database management software, web application software, streaming application software, for example.

The alternate path software 61 manages logical paths between the host 51a and logical storage devices (LDEV) in the virtual storage system 100a and executes alternate path control. alternate path control involves controlling which logical path among a plurality of logical paths is used to access an LDEV. The alternate path software 61 comprises an alternate path management program (not shown), an inter-storage system alternate path program (not shown), a priority control program (not shown), and the same-device correspondence table 62 of FIG. 2. Further, the aforementioned programs and table are managed for each of the virtual storage systems 100a and 100b. The same is true of the following description. The virtual storage system 100a will be described here.

The alternate path management program performs management and control of the whole alternate path software 61.

The inter-storage system alternate path program recognizes the plurality of logical paths connected to the same external LDEV 701 via each of the plurality of storage systems 20 as alternate paths. Further, the external LDEV is an LDEV that is provided in the external storage system 70 and is an LDEV that is mapped to the LDEV of the storage system in the virtual storage system 100.

The priority control program selects a logical path that is to be used as a priority from among the plurality of logical paths on the basis of the usage rate of each of the plurality of logical paths connected to the same LDEV.

Figure 2:
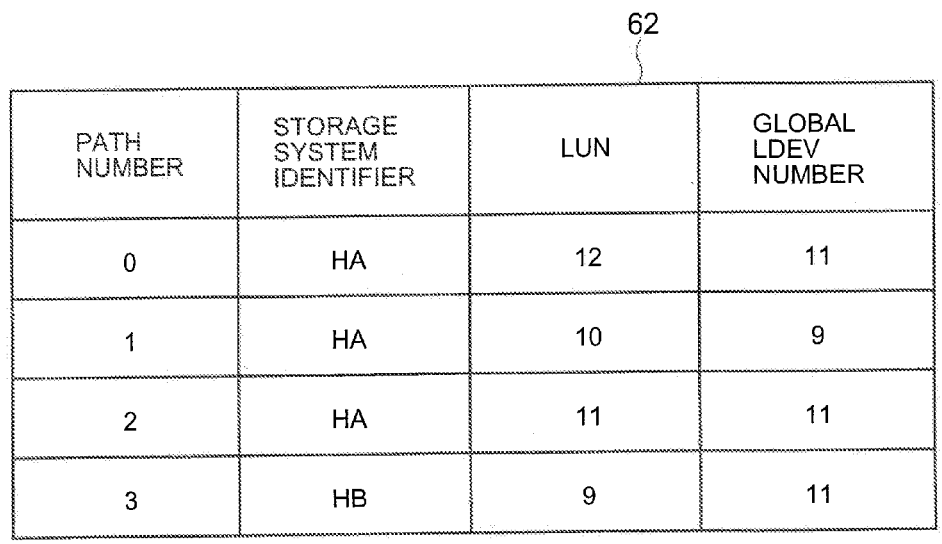
FIG. 2 shows a constitutional example of a same-device correspondence table 62.

The same-device correspondence table 62 shows the correspondence relationship between the logical paths and logical devices in the environment of a network in which different logical paths are connected to the same logical device. More specifically, the path numbers, identifiers of the storage systems of the virtual storage system, LUN, and global LDEV numbers are recorded for each logical path as shown in FIG. 2 in the same-device correspondence table 62, for example. Here, the global LDEV numbers of the logical paths with path numbers 0, 2, and 3 are the same because the respective local LDEV numbers corresponding with the same global LDEV numbers are connected to the same external LDEV. That is, irrespective of the logical path via which access is made among the plurality of logical paths, ultimately, access is made to the same external LDEV (the global LDEV numbers and local LDEV numbers will be described hereinafter). Each of the plurality of logical paths will be called an 'alternate path' hereinbelow. further, when the same-device correspondence table 62 is stored in the storage system 20 and the virtual storage system is constructed by a plurality of storage systems, for example, preparations are made for each virtual storage system 100. Further, as well as alternate paths, a single logical path can also be managed by the same-device correspondence table 62. In other words, the correspondence relationships between the LUN recognized by the application 60 and the global LDEV numbers managed by the storage system 20 are registered in the same-device correspondence table 62.

The storage system 20 can be broadly classified into a control unit and a storage unit, for example. the control unit comprises, for example, a CPU (central processing unit) 21, a memory 22, a disk interface control unit 23, FC (fiber channel) interface control units 25 and 26, and LAN (local area network) interface control units 27 and 28. The storage section is a disk unit 24, for example.

The CPU 21 executes a variety of control processes of the storage system 20 by executing a variety of programs or modules stored in the memory 22. The memory 22 is called the internal storage device and includes an involatile memory for storing a variety of modules and so forth and a volatile memory for temporarily holding the results of the computation processing of the cpu21.

The CPU 21 is connected to the disk unit 24 via the disk interface control unit 23. the disk interface control unit 23 converts logical addresses output from the CPU 21 into IBA (logical block address) and enables access to the logical devices by the cpu21.

The disk unit 24 comprises a plurality of disk drives 240 with a raid (redundant arrays of independent inexpensive disks) constitution. The disk drives 240 are physical devices such as FC (fibre channel) disk drives, SATA (serial advanced technology attachment disk drives, PATA (parallel advanced technology attachment) disk drives, FATA (fibre attached technology adapted disk drives, SAS (serial attached SCSI) disk drives or SCSI (small computer system interface) disk drives. A physical device is a real device with a real storage area. Further, a physical device is not limited to a disk drive 240 and another type of storage device (flash memory, for example) may also be adopted.

The LDEV 242 is a virtual device without a real storage area. an actual storage area for storing data exists in the logical device 701 in the external storage system 70. That is, the storage system 20 incorporates the external LDEV 701 of the external storage system 70 as its own internal device and provides same to the host 51 as a logical unit. When the host 51 is a UNIX (registered trademark)-based system, the logical unit is associated with a device file. when the host 51 is a windows (registered trademark)-based system, the logical unit is associated with a drive letter (drive name). A LUN (logical unit number) is assigned to the logical unit. The details of the method of virtualization whereby the external LDEV 701 is an internal device of the storage system 20 as it were will be disclosed in Japanese patent application laid open no. 2005-107645. That is, for the external connection of this embodiment, the technology disclosed in Japanese patent application laid open no. 2005-107645 (U.S. application Ser. No. 10/769,805, U.S. application Ser. No. 11/471,556), for example.

The command device 243 is a dedicated logical unit for delivering commands and statuses between the host 51 and storage systems 20. The commands transmitted from the host 51 to the storage systems 20 are written to a command device 243. The storage system 20 executes processing corresponding with the commands written to the command device 243 and writes the execution results to the command device 243 as the status. The details of the command management using the command device 243 will be described subsequently.

The disk interface control unit 23 is able to control a plurality of disk drives 240 by the raid level (0, 1, 5, for example) specified by the raid system. In a raid system, a plurality of disk drives 240 are managed as one raid group. The raid group is constituted by grouping four disk drives 240 as one set (3d+1p) or by grouping eight disk drives 240 as one set (7d+1p), for example. That is, one raid group is constituted by assembling storage areas provided by a plurality of disk drives 240. A plurality of logical devices 241 constituting access units accessed by the host 51 are defined in the raid group. One or more logical devices 241 are mapped with a logical unit constituting a logical storage area recognized by the host 51. The host 51 is able to access the logical devices 241 by designating the LUN and IBA.

Further, if the storage system 20 is able to supply the storage areas of the external storage system 70 to the host 51 by connecting to the external storage system 70, the storage system 20 need not necessarily comprise the disk unit 24 and disk interface control unit 23.

There is a dedicated communication line 44 for transferring commands, control information, and data between the storage systems 20a and 20b in the virtual storage system 100a. In the case of a constitution without the communication line 44, the commands, control information, and data can be transferred via the host 51.

Further, one virtual storage system 100 may be connected to one or more external storage systems 70 and an external storage system 70 may be connected from a plurality of virtual storage systems 100.

An FC interface control unit 25 controls the transfer of commands and data and so forth via a san 43 between the storage systems 20 and external storage systems 70. An FC interface control unit 26 controls the transfer of commands and data and so forth via the san 41 between the storage systems 20 and hosts 51. A fiber channel protocol and ISSCSI protocol and so forth can be adopted as the data communication protocol via the san 41 and 43, for example. Further, the san 43 is not essential and the FC interface control unit 25 and external storage system 70 may be directly connected by an optic fiber cable or the like.

A LAN interface control unit 27 is connected to a management server 50 via a management network 40. The management network 40 is a LAN constituted by an Ethernet (registered trademark) cable or the like. The data communication protocol of the management network 40 is TCP/IP, for example. The management server 50 is able to manage the settings of the access path (LUN masking and zoning and so forth) between the host 51 and virtual storage systems 100 through the creation of LDEV in the virtual storage systems 100 and the allocation of a LDEV to the host 51.

The external storage system 70 has one or more disk drives 700 with a raid constitution. the disk drive 700 may be a storage device such as an FC (FIBRE channel) disk drive, SATA (serial advanced technology attachment) disk drive, PATA (parallel advanced technology attachment) disk drive, FATA (FIBRE attached technology adapted) disk drive, SAS (serial attached SCSI) disk drive or SCSI (small computer system interface) disk drive. An external LDEV 701 is formed on a plurality of disk drives 700. Further, there may be storage devices of another type (flash memory, for example) instead of or in addition to the disk drive 700.

Further, the external storage system 70 may be of a different type from the storage system 20 or may be of the same type as the storage system 20.

An SVP (service processor) 81 is a computer terminal that sets information on the constitution of the storage system 20 (including the device information table 106 and mapping table 108 described subsequently) and acquires operating information and so forth. The svp81 is connected to a LAN interface control unit 28 of the storage system 20. The respective svp81 connected to the respective storage systems 20 is connected to one master SVP. The master SVP centrally manages information (information on the constitution of the storage system 20 as well as operating information and so forth) that is collected from the respective svp81. One of a plurality of svp81 may also function as the master SVP or the respective storage systems 20 may be directly connected to a master svp82. A management method that comprises the master SVP will be described subsequently.

The virtual storage system 100 indicates the range in which the command transfers and volume migration between the respective storage systems 20 can be executed by sending and receiving constitution information between the storage systems 20. When the external storage system 70 is connected to the respective storage systems 20, the range of the virtual storage system 100 includes the plurality of storage systems 20 and the external storage system 70. When an external storage system 70 is not connected to the respective storage systems 20, the range of the virtual storage system 100 includes the plurality of storage systems 20 and does not include the external storage system 70.

The respective storage systems 20 can be constituted as a disk array system that comprises a plurality of disk drives 240 with a raid constitution or can be constituted as a virtualization switch with the respective storage systems 20 themselves are the SCSI targets, for example. A device that manages management identifiers that are hierarchized such as LDEV numbers and controls the operation of storage systems can be called a 'control device'. A control device may be in the storage system 20 or outside same.

The management network 40 is connected to one or more hosts 51. further, one or more client computers 30 are connected to the management network 40. The respective client computers 30 are able to connect to the hosts 51 via the management network 40 and issue data i/o requests to the virtual storage systems 100 via the application program 60.

Figure 3:
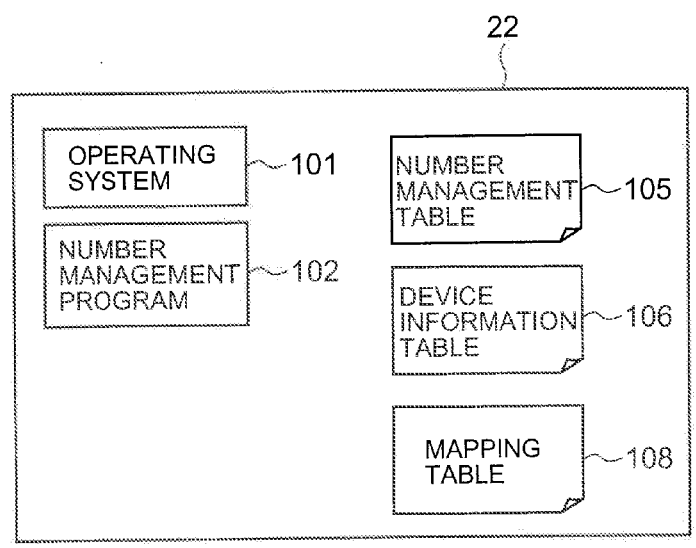
FIG. 3 shows various programs and tables that are stored in a memory 22 of a storage system 20.

FIG. 3 shows various programs and tables that are stored in the memory 22 of the storage system 20.

An operating system 101, a number management program 102, the number management table 105, device information table 106, and mapping table 108, for example, are stored in the memory 22.

The number management table 105 is a correspondence table of global LDEV numbers and local LDEV numbers. The device information table 106 is a table that holds attributes of the logical devices. The mapping table 108 is a table that shows the correspondence relationship between the LDEV number of the external LDEV 701 and the local LDEV number (may be a global LDEV number instead of or in addition to same).

FIGS. 4a and 4b show constitutional examples of the number management table 105.

The number management table 105 is a correspondence table of 'global LDEV numbers', which are numbers visible to devices higher than the virtual storage system 100 (the host 51 and/or virtualization device 52) and 'local LDEV numbers', which are the numbers when processing is performed within the storage system 20. For example, a request with a global LDEV number is received from the host 51a, the local LDEV numbers corresponding with the global LDEV numbers are acquired from the table 105 by the number management program 102 and processing (writing or reading (i/o) processing with respect to the LDEV, for example) is performed by using the acquired local LDEV number. Only the information on the global LDEV numbers is held as mentioned earlier in the alternate path software 61 (see FIG. 2). The difference between FIGS. 4a and 4b will be described subsequently.

Furthermore, although an example of a table of LDEV numbers is shown here, the table is not limited to LDEV numbers. The same table can also be held for other types of management identifiers (copy system pair numbers and group numbers and so forth, for example) used by separate storage systems but with the risk of duplication because there is one virtual storage system. In particular, a management identifier that is designated by a request of some kind from a higher-level device (host, for example) can be cited as another type if management identifier, for example.

FIG. 5 shows a constitutional example of the device information table 106.

The device information table 106 is a table for managing the attributes of the respective LDEVs. a 'device number', 'status flag' and 'external device flag' are recorded for each LDEV, for example, in the device information table 106.

A 'device number' is a local LDEV number for uniquely recognizing the LDEVs 241 and 242 in the storage system 20.

The 'status flag' indicates a state where the LDEV 241 and 242 in the storage system 20 are being used or a state where same are not being used (empty state). On in the device information table 106 is a state where the LDEV 241 and 242 are being used.

The 'external device flag' indicates whether the LDEV (virtual device) 242 in the storage system 20 is being used as the external LDEV 701. On in FIG. 5 indicates that the LDEV 242 is being used as an external LDEV. "Off" indicates that the LDEV 241 is being used as an internal LDEV. The default value of the external device flag is "off" and, when the LDEV 242 in the storage system 20 is mapped to the logical device 701 in the external storage system 70, "off" is changed to "on".

FIG. 6 shows the flow of processing that is performed when the storage system 20 receives an access request. the serial process flow that is performed when the virtual storage system 100a is accessed by the host 51 will now be described with reference to FIG. 6 and FIGS. 1 and 3.

The application program 60 issues an access request that designates a LUN. the alternate path software 61 specifies the storage system identifier and global LDEV number corresponding with the LUN designated by the access request from the same-device correspondence table 62. The alternate path software 61 issues an access request that designates a global LDEV number to the storage system 20 that is recognized by the storage system identifier. The alternate path software 61 may issue an access request by using another alternate path when there is a special reason to do so such as mixing of the alternate paths corresponding with the designated LUN.

As shown in FIG. 6, the storage system 60 receives an access request that designates a global LDEV number (step s101). In this case, the storage system specifies the local LDEV number that corresponds with the global LDEV number from the number management table 105 by means of the number management program 102. The storage system 60 (i/o processing program (not shown), for example) references the device information table 106 and judges whether the specified local LDEV number corresponds with an internal LDEV (whether the external device flag is "off") or corresponds with an external LDEV (whether the external device flag is "on") (s102). That is, it is judged whether the access request is an access request to access the external LDEV 701 or an access request to access the internal LDEV 241.

In the event of an access request to the external LDEV 701 (yes in s102), the storage system 20 references the mapping table 108, performs an address conversion or the like to the external LDEV 701 and transmits an access request to access the external LDEV 701 to the external storage system 70 (s104). on the other hand, the storage system 20 accesses the internal LDEV 241 in the event of an access request to access the internal LDEV 241 (no in s102) (s103).

The whole system of this embodiment was described hereinabove.

Figure 20:
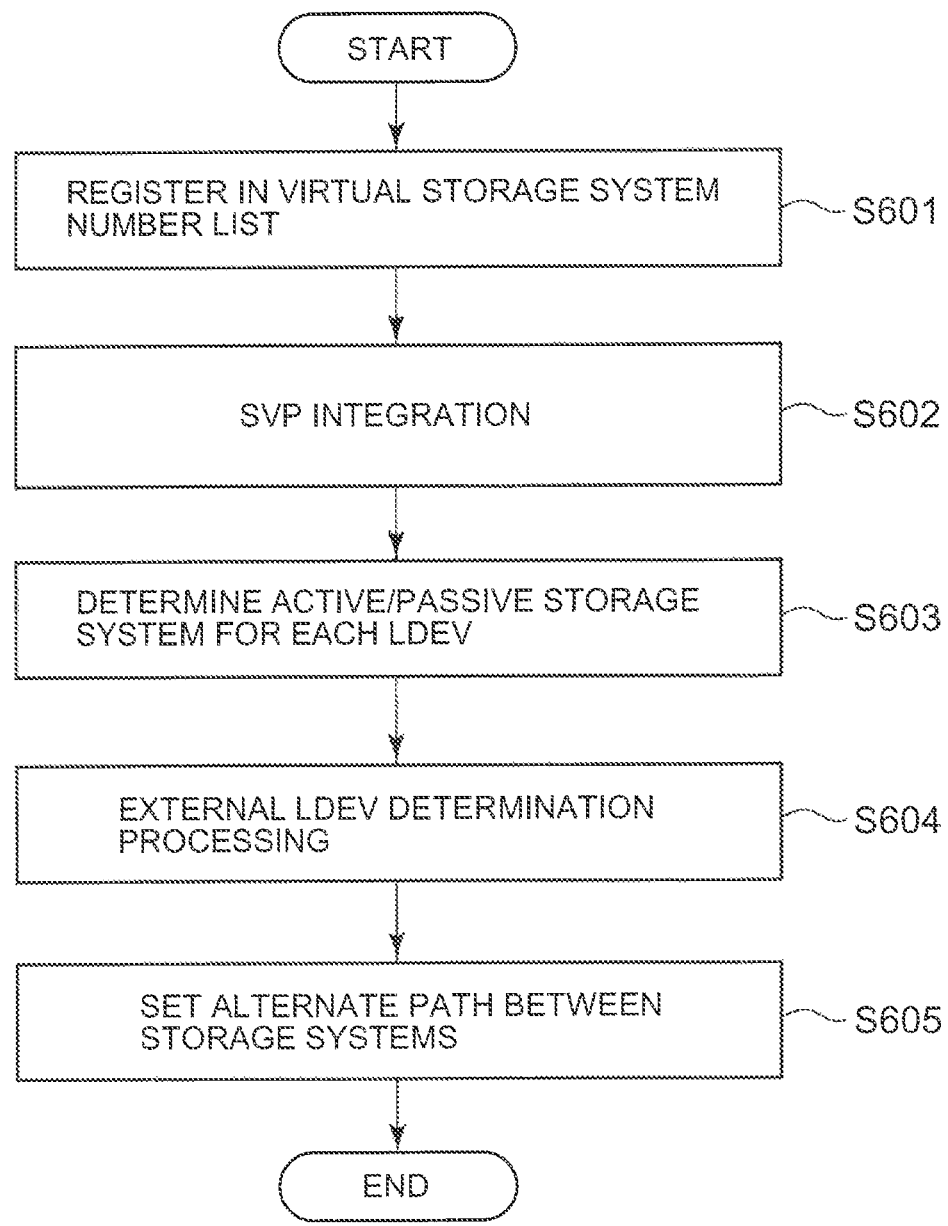
FIG. 20 is a flowchart showing an example of the procedure for constructing a virtual storage system.

In this embodiment, the virtual storage system is constructed by means of the procedure described hereinbelow. this procedure will be described with reference to FIG. 20.

1. Determination of the Storage Systems that Construct the Virtual Storage System (s601)

For example, the management server 50 receives a designation of the number of the virtual storage system (unique number of the virtual storage system managed within the management server 50) from the manager and a designation of the numbers of the storage systems contained in the virtual storage system (unique numbers of the storage systems managed within the management server 50). Registration of the various designated numbers is performed. further, when the virtual storage system is newly created, the new virtual storage system number created by means of a predetermined method (alphabetic character of final digit of final virtual storage system number is changed to the next alphabetic character, for example) is allocated to the new virtual storage system.

2. SVP Integration (s602)

The MSVP and SVP number lists of FIGS. 12 and 13 are registered. When a virtual storage system environment is created without integrating the SVP with the plurality of SVP left as is, this processing is not executed.

3. Determination of Active/Passive Storage System (s603)

The details of the virtual storage system 100 are decided. More specifically, it is decided by which storage system 20 an alternate path is to be extended to the external ldev 701. This is performed for each LDEV of the storage system.

4. External LDEV Determination Processing (s604)

An external ldev 701 that is recognized by the storage system 20 is determined (added, for example). When the same external LDEV 701 is mapped to the respective virtual devices of the plurality of storage systems 20, the external LDEV 701 is recognized by the plurality of storage systems 20.

5. Setting of Alternate Path Between Storage Systems (s605)

For example, when an external LDEV 701 is recognized by the storage systems 20*a* and 20*b*, for example, an alternate path through each of the different storage systems 20*a* and 20*b* is established. further, in 3, one of the plurality of storage systems 20 capable of accessing the same external LDEV 701 (storage system with control right, for example) is active and the others are passive.

This embodiment will be described further hereinbelow. this description is provided in the order of (a) hierarchized LDEV numbers, (b) integrated SVP, and (c) fail over of virtual storage system 100. further, although the host 51 and virtualization device 52 and so forth may be considered as higher level devices than the storage system 20, the high level device is the host 51*a* in the following description.

(a) Hierarchized LDEV Numbers

The hierarchized LDEV numbers are feature of this embodiment. That is, the LDEV numbers used in the processing in the storage system are local LDEV numbers and new conceptual LDEV numbers provided to the host 51*a*, that is, global LDEV numbers, are prepared. When the respective storage systems are to be members of the virtual storage system 100, global LDEV numbers are held in addition to local LDEV numbers. Even when there is no special need for global LDEV numbers, the holding of global LDEV numbers by the storage system is useful in this embodiment. That is because the storage systems can smoothly be made members of the virtual storage system.

Further, the hierarchization of LDEV numbers in this embodiment is a completely different concept from the hierarchy of LUN and LDEV numbers as disclosed in the above publication on the external connection, for example. In this embodiment, a LUN is an identifier whereby an open host (host of open-type system) identifies one LU (logical unit) which is decided by a combination of a port number and SCSI-ID. That is, this is not a number than can be changed arbitrarily. In this embodiment, hierarchized LDEV numbers are prepared below the LUN that cannot be changed arbitrarily and, by changing the hierarchized ldev numbers, storage systems that operate independently can be incorporated in the virtual storage system and storage systems can be removed from the virtual storage system without impacting the higher level.

The specifics will be described hereinbelow. Further, when the respective elements of the storage systems 20*a* and 20*b* are used in the description hereinbelow, sometimes child codes that are the same as the child codes of the storage system comprising these elements are used as the parent numerals of the elements. for example, when the number management program is used in the description, the number management program of the storage system 20*a* is '102*a*' and the number management program of the storage system 20*b* is '102*b*'.

Figure 7A:
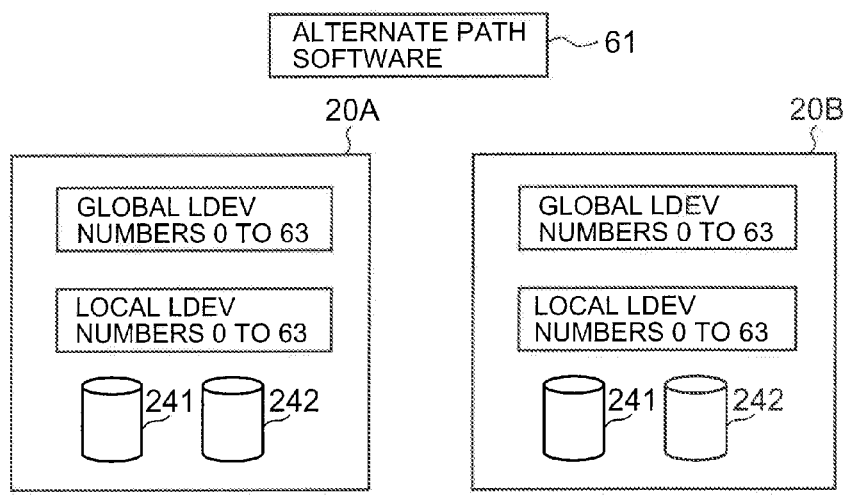
FIG. 7a shows the relationship between the global LDEV numbers of respective storage systems 20A and 20B that do not constitute a virtual storage system and local LDEV numbers.
Figure 7B:
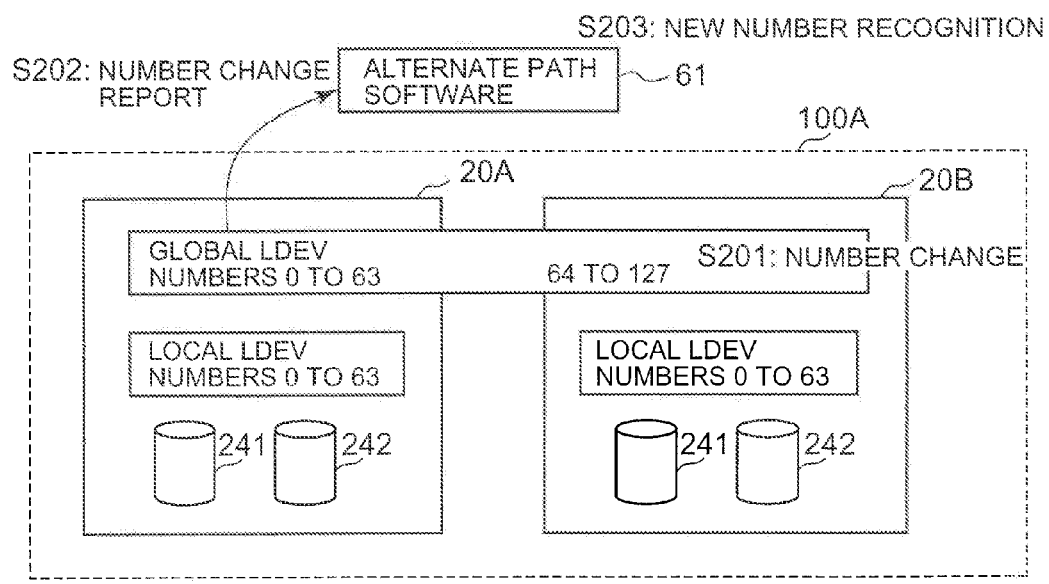
FIG. 7b shows the relationship between the global LDEV numbers of the respective storage systems 20A and 20B that constitute a virtual storage system and local LDEV numbers.

Suppose that the storage systems 20*a* and 20*b* each operate as single systems as in FIG. 7*a*. The LDEV 241 and 242 in the storage system 20*a* are allocated LDEV numbers in the storage system 20*a* and perform processing based on these LDEV numbers. The LDEV numbers are local LDEV numbers. When the storage systems are not members of the virtual storage system 100*a*, the global LDEV numbers of the LDEV have the same values as the local LDEV numbers of the LDEV, for example. This is also true of the storage system 20*b*. suppose that the storage systems 20*a* and 20*b* have local LDEV numbers and global LDEV numbers from 0 to 63.

In this embodiment, global LDEV numbers are supplied to the alternate path software 61 irrespective of whether the storage systems 20 are members of the virtual storage systems 100. Global LDEV numbers are designated by access requests from the host 51*a*. for example, when operating as a single unit, the storage system 20*b* has the same values as the global LDEV numbers and local; DEV numbers registered in the number management table 105*b*. FIG. 4*a* shows an example of the number management table 105*b* in the storage system 20*b* that is operating as a single unit.

Here, suppose that the virtual storage system 100*a* is newly constructed by the storage systems 20*a* and 20*b*. In this case, processing to repair the global LDEV numbers which are the higher-level LDEV numbers is performed in this embodiment.

More specifically, the number management program 102*b* changes the global LDEV numbers of the storage system 20*b* from 0 to 63 to 64 to 127 (s201). FIG. 4*b* shows the number management table 105 in the storage system 20*b* after global LDEV numbers have been changed. Further, the fact that the global LDEV numbers of the storage systems 20*a* and 20*b* are 0 to 63 can be specified by a variety of methods such as through interaction between the number management programs 102 or receiving notice from the management server 50.

Thereafter, the number management program 102*b* reports number change information relating to changes in the global LDEV numbers to the alternate path software 61 (s202). Number change information includes, for example, the numbers of the newly constructed virtual storage system 100*a*, the respective numbers of the storage systems 20*a* and 20*b* constituting the virtual storage system 100*a*, and the global LDEV numbers before and after changes by the respective storage systems 20*a* and 20*b*.

The alternate path software 61 recognizes from the number change information that the storage systems 20*a* and 20*b* are the virtual storage system 100*a* and the global LDEV numbers have been changed to 0 to 127 (s203). The alternate path software 61 updates the same-device correspondence table 62 on the basis of the received number change information. More specifically, because the storage systems 20*a* and 20*b* operate separately, for example, the alternate path software 61 comprises same-device correspondence tables 62*a* and 62*b* that correspond with the storage systems 20*a* and 20*b*. The alternate path software 61 knows from the received number change information that one virtual storage system 100*a* is constructed by the storage systems 20*a* and 20*b*. In this case, the alternate path software 61 creates one table from the tables 62*a* and 62*b* (for example, newly prepares one same-device correspondence table and registers the respective information items recorded in the same-device correspondence tables 62*a* and 62*b* in the new same-device correspondence table). The alternate path software 61 then specifies the respective global LDEV numbers prior to the change in the storage systems 20*a* and 20*b* contained in the received number change information from the new same-device correspondence table. The alternate path software 61 updates each of the specified global LDEV numbers to the respective changed global LDEV numbers in the storage systems 20a and 20b which are contained in the received number change information.

As a result of the serial processing above, it is possible to prevent a particular effect on the application program 60 even when the storage systems 20a and 20b that operate separately are one virtual storage system 100a. The alternate path software 61 is able to prevent a particular effect on the host 51 when the alternate path software 61 is installed in the virtualization device 52 rather than the host 51. Further, the changing of the global LDEV numbers and the reporting of number change information may be performed by the number management program 102a instead of or in addition to the number management program 102b.

Further, as mentioned earlier, when the update of the same-device correspondence table is performed by changing the global LDEV numbers, the storage system 20b receives an access request with the global LDEV numbers 64 to 127 from the host 51a. The storage system 20b specifies the local LDEV numbers corresponding with the changed global LDEV numbers designated by the access request from the updated number management table 105b. Processing corresponding with the access request (access to the LDEV corresponding with the specified local LDEV numbers) can be executed by means of the specified local LDEV numbers.

Further, in s201, the number management program 102b (and/or 102a) ascertains from the mapping tables 108a and 108b whether the external LDEV associated with the local LDEV number of the storage system 20b is also associated with the storage system 20a and, if such an association exists, the number management program 102b is able to assign the same global LDEV number to the plurality of local LDEV numbers associated with the same external LDEV in changing the global LDEV number.

Figure 8A:
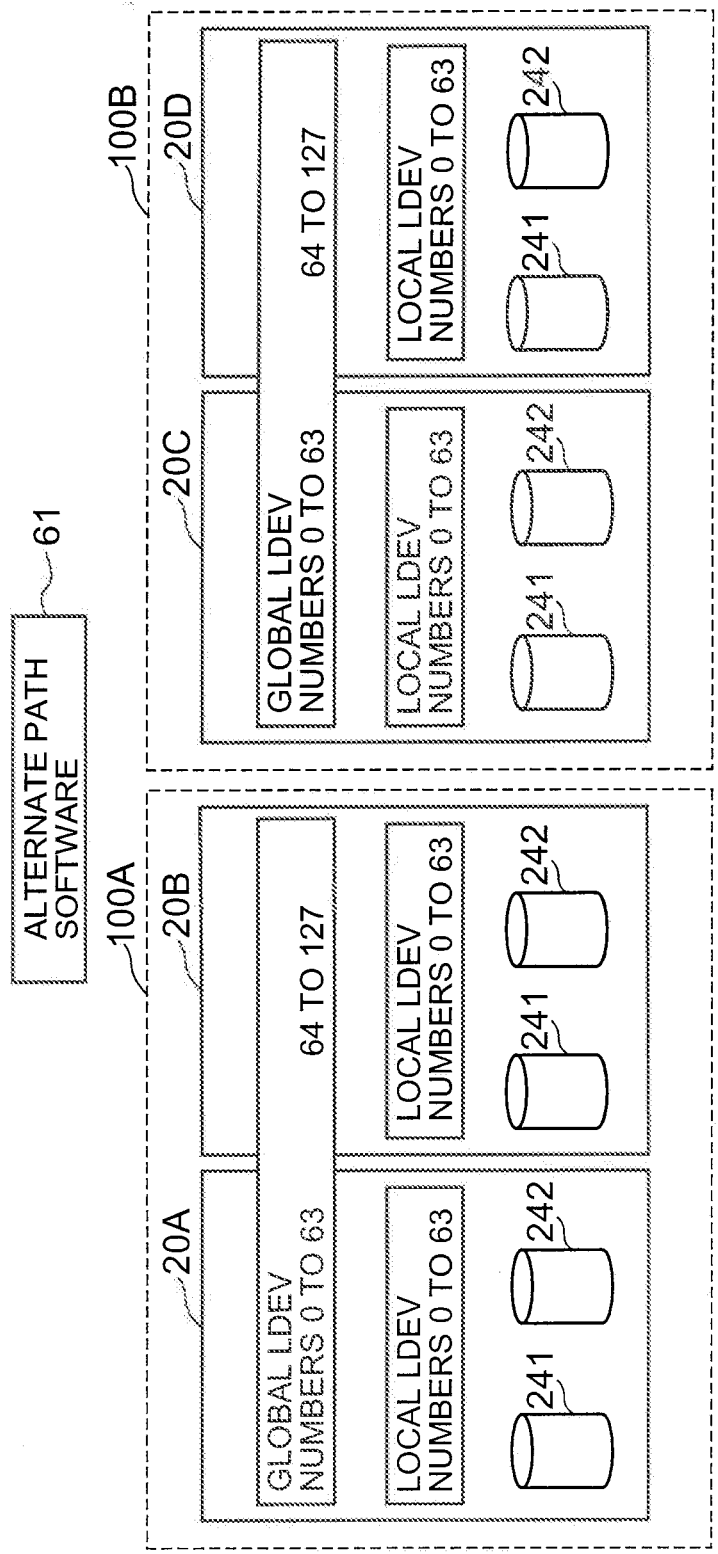
FIG. 8A shows the relationship between the global LDEV numbers of separate virtual storage systems 100A and 100B and local LDEV numbers.

Furthermore, the above serial processing is not limited to one virtual storage system being constructed by a plurality of storage systems. Another virtual storage system can also be merged with one virtual storage system. FIGS. 8a and 8b show specific examples of a case where one virtual storage system 100c is constructed by merging the virtual storage system 100b with the virtual storage system 100a. according to this example, as shown in FIG. 8a, the numbers 0 to 127 are assigned as global LDEV numbers to each of the virtual storage systems 100a and 100b. however, when one virtual storage system 100c is constructed, the global LDEV numbers of the virtual storage system 100b are changed from 0 to 127 to 128 to 255 as shown in FIG. 8b. Further, the changing of the numbers can be performed by at least one of the number management programs 102a to 102d.

Thus, the changing of the global LDEV numbers and the reporting of the number change information is not limited to a case where a virtual storage system is newly constructed and is also applicable to cases where a virtual storage system or storage system is merged with a virtual storage system.

When a storage system 20 (or virtual storage system) is removed from one virtual storage system 100, the number of global LDEV numbers naturally also changes proportionately. For example, when storage system 20b is removed from FIG. 8b, the global ldev numbers 64 to 127 are eliminated from the global LDEV numbers 0 to 255 of the virtual storage system 100c. In this case, the global LDEV numbers may be switched at the time of removal (128 to 255 may be changed to 64 to 191) and the switching of the global LDEV numbers may be performed when the storage system 20 is merged the next time. Further, the removed storage system 20b can also be made to operate independently. The number management program 102b of the removed storage system 20b changes the global LDEV numbers 64 to 127 to the same numbers as its own local LDEV numbers (numbers 0 to 63, for example) upon sensing that the storage system 20b has been removed from the virtual storage system is now independent.

Furthermore, an ld LDEV of a certain storage system can also be moved to another storage system within one virtual storage system. An example where the LDEV with global LDEV number 10 of the virtual storage system 100a is moved from the storage system 20a to the storage system 20b will be described hereinbelow.

For example, upon receiving an instruction to move the LDEV with global LDEV number 10, the storage system 20a moves the control right of the LDEV with global LDEV number 10 from storage system 20a to storage system 20b. Thereupon, the LDEV with global LDEV number 10 is unique in the virtual storage system 100a and therefore, even when the LDEV is moved from storage system 20a to storage system 20b, the LDEV with global LDEV number 10 remains unchanged as number 10. On the other hand, the association between global LDEV number 10 and the local LDEV number is changed for each of the storage systems 20a and 20b. more specifically, for example, the number management program 102a deletes global LDEV number 10 from the number management table 105a and the number management program 102b specifies an unused local LDEV number from the number management table 105b and associates global LDEV number 10 with the unused local LDEV number specified. As an example, let us assume that, prior to the move, global LDEV number 10 is associated with the local LDEV number 10 in the storage system 20a but that, following the move, global LDEV number 10 is associated with local LDEV number 30 in storage system 20b. Thus, the move is not seen by the host 51 and, even when an access request is sent, this has no effect because the global LDEV number has not changed. The fact that the volume control rights have moved is recognized by the storage systems 20a and 20b and the storage system 20b associates the unused local LDEV numbers with the transfer-target global LDEV numbers.

When remote copying is generated between virtual storage systems 100, there is no need for a match between global LDEV numbers in the copy source and copy destination. A conventional remote copy pair may essentially be generated. Furthermore, the case of a local copy generated within the virtual storage system 100 is also similar.

Volumes that can be moved between storage systems 20 in the virtual storage system 100 are called 'virtual storage system application volumes'. Volumes within the virtual storage system 100 may all be virtual storage system application volumes or there may be a mixture such that a portion of the volumes in the virtual storage system 100 are virtual storage system application volumes while the remaining volumes are conventional volumes used only within the respective storage systems 20.

(b) Integrated SVP

An SVP integrated management method will be described next with reference to the drawings.

SVP integrated management provides one master SVP (MSVP hereinbelow) in a virtual storage system 100 and manages a plurality of other SVPs by means of the MSVP. The information acquired by the plurality of other SVPs is transmitted actively to the MSVP and managed all together by the MSVP.

Figure 9A:
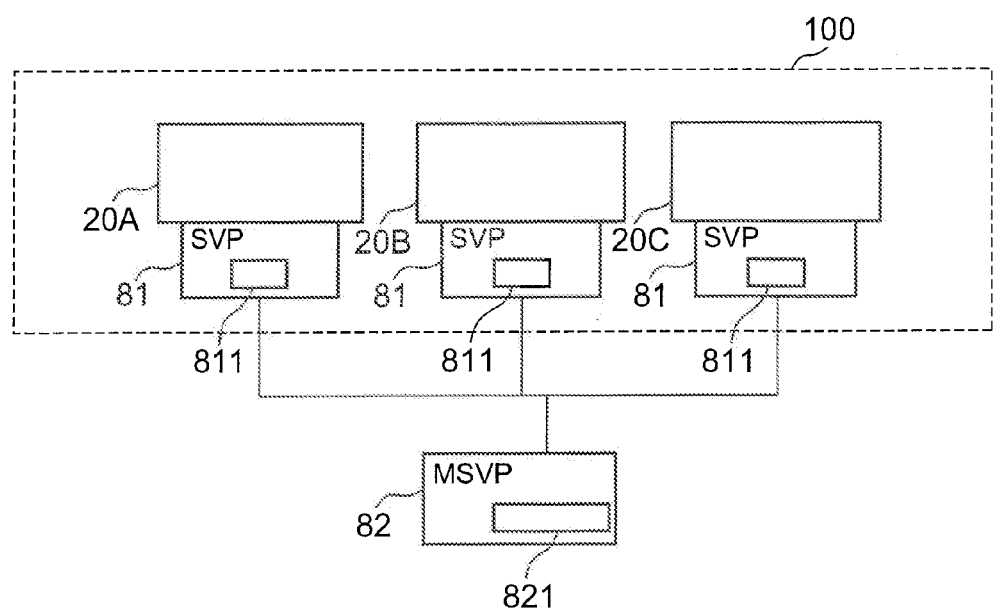
FIG. 9A is an explanatory diagram of a first method of SVP integrated management.

As a first method of SVP integrated management, there is a method that newly sets the master SVP (MSVP hereinbelow) 82 shown in FIG. 9a. This procedure will now be described with reference to FIG. 10.

The SVPS 81 in the respective storage systems 20 are connected by means of a network (s301). Suppose that a new computer is connected on the network and this computer is the MSVP 82 (s302). When a predetermined event occurs in the MSVP 82 (in the event the connection of a computer to the network is sensed, for example), an MSVP setting program 821 for making MSVP settings is executed by the processor of the MSVP 82.

The MSVP setting program 821 recognizes the identifiers of all the SVP 81 in the virtual storage system 100 (s303). The identifiers of the SVP are set for each SVP 81. the method involves the MSVP setting program 821 receiving an input of the identifiers of all the svp81 in the virtual storage system 100 from the user or sending a message and the identifier of the MSVP 82 by means of a broadcast to all the svp81 and receiving in return the identifiers of the SVP 81 from an inter-SVP recognition program 811 for the respective svp81. The MSVP setting program 821 stores an SVP list (not shown) in the storage resource of the msvp82 (memory, for example). The SVP identifiers of the respective SVP 81 are recorded in the SVP list.

Each SVP 81 (more specifically, the control program executed by the processor of the SVP, for example) registers the MSVP identifier received from the MSVP 82 in its own storage resource (memory, for example) (s304). The MSVP identifier may also be input by the user.

Each of the SVP 81 sends information that is being managed on the SVP 81 to the MSVP 82 and information managed by the respective SVP (these are called slave SVP: SSVP) 81 is managed all together by the MSVP 82 (s305). For example, the ssvp81 acquires the number management table 105 from the storage system to which it is itself connected and transmits the acquired number change table 105 to the msvp82.

The fact that the msvp82 and other ssvp81 have been set is reported by the MSVP setting program 821 to all the storage systems 20 constituting the virtual storage system, for example (s306). For example, the MSVP identifier and respective SSVP identifiers are reported to the respective storage systems 20 and recorded in the memory 22 or the like of the storage system 20.

Upon receiving information from the respective ssvp81, the MSVP setting program 821 associates the identifiers of the ssvp81 constituting the transmission origin of the information with the received information. As a result, the MSVP 82 is able to consciously manage the SSVP information of any storage system 20. The msvp82 may be duplicated to afford alternate systems.

According to a first method, the loads of the ssvp81 can be made even. Further, is can also be easily adapted to adding or removing storage systems 20.

Figure 9B:
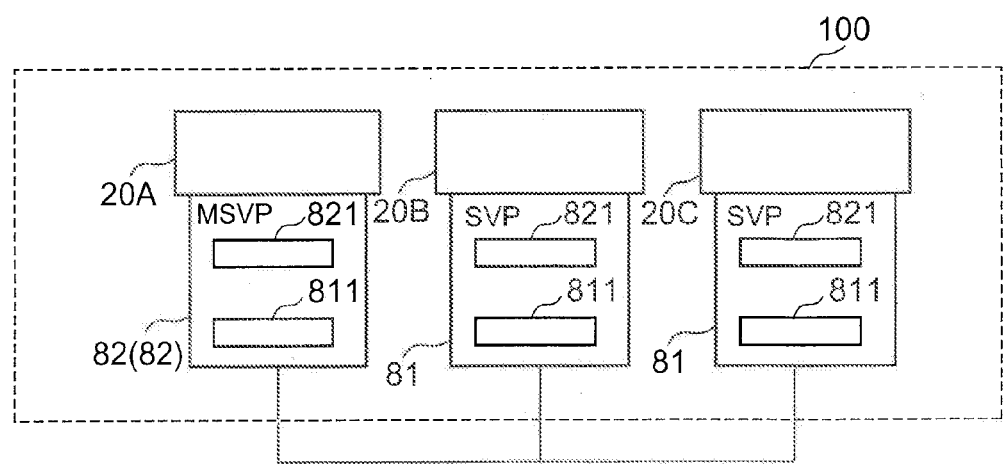
FIG. 9B is an explanatory diagram of a second method of SVP integrated management.
Figure 11:
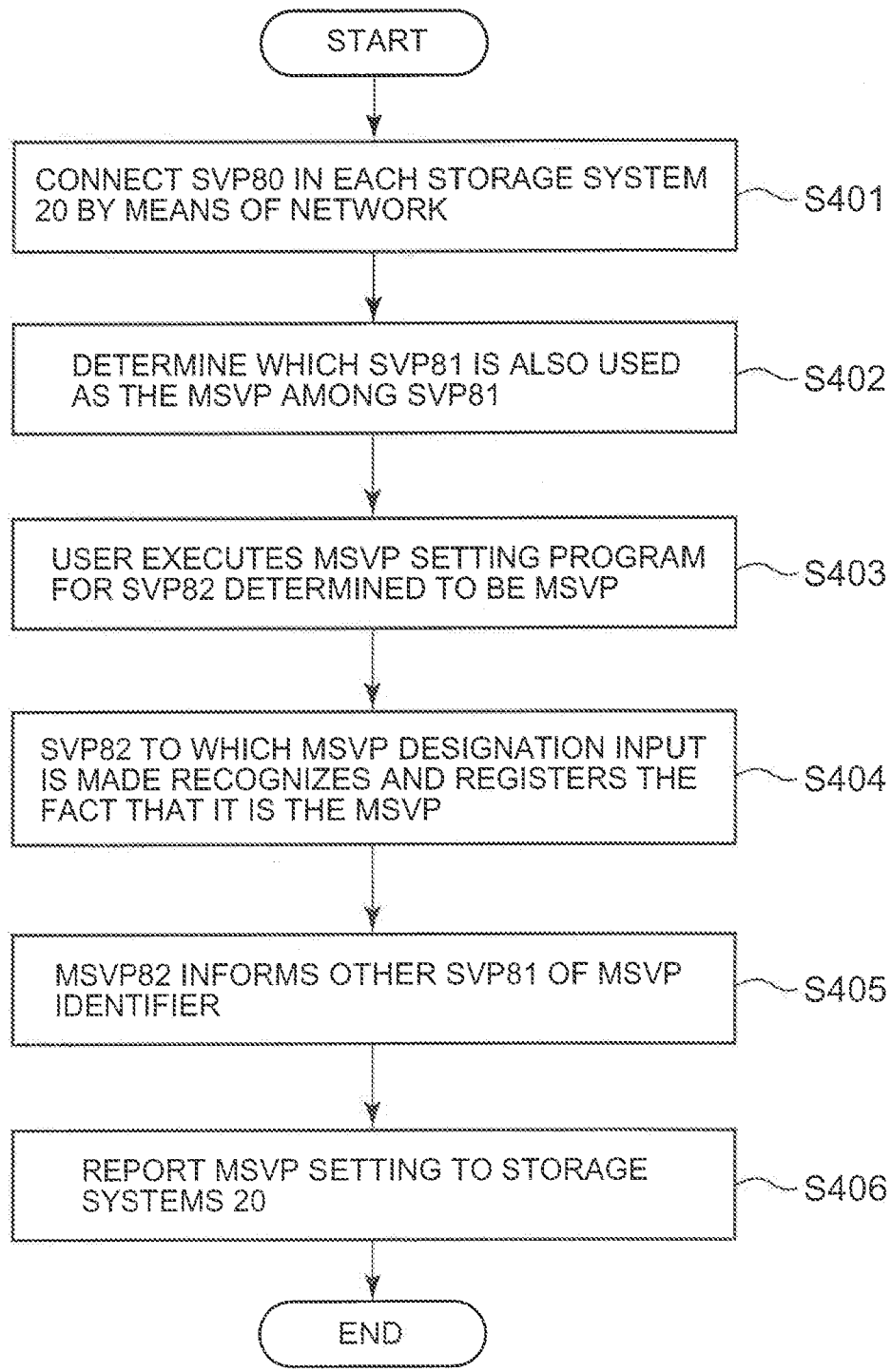
FIG. 11 is a flowchart showing the procedure for performing SVP integrated management by means of the second method.

A second method of SVP integrated management includes a method of using one of the plurality of SVP 81 as the MSVP as shown in FIG. 9b. The procedure will be described with reference to FIG. 11.

The SVP 81 in the respective storage systems 20 are connected by a network (s401).

Thereafter, the user determines the spv81 among the plurality of spv81 that is also to be used as the MSVP, for example (s402). Any of the respective SVP 81 can be an MSVP. Hence, the SVP 81 all have the MSVP setting program 821 beforehand and an svp81 executes the program 821 only when selected as the MSVP. Further, all the SVP 81 have the inter-SVP recognition program 811 and perform mutual communication between svp81.

The user executes the MSVP setting program 821 of the SVP 81 determined as the MSVP (s403). the SVP 82 (81) that executes the MSVP setting program 821 recognizes the fact that it is the MSVP and registers for the control information in the MSVP 82 (s404). more specifically, for example, the MSVP setting program 821 registers information signifying that the SVP 82 is the MSVP in the storage resource of the SVP 82.

The MSVP setting program 821 advises the other SVP 81 of the MSVP identifier (own identifier) by means of a broadcast (s405). An INTESVP recognition program 811 of each of the other SVP 81 receives an MSVP identifier and registers the MSVP identifier in the storage resource of the svp81 that comprises the INTESVP recognition program 811. Further, each of the other SVP 81 sends back its own identifier to the MSVP 82 in response to receiving the MSVP identifier. The INTESVP recognition program 811 of each of the other svp81 also transmits information managed by the storage resource of the svp81 that comprises the INTESVP recognition program 811 to the msvp82. As a result, the management information of all the other svp81 is centrally managed by the msvp82. The number change table 105 in the storage system to which the other svp81 are connected, for example, exists for the information transmitted from the other svp81 to the msvp82.

The MSVP setting program 821, for example, reports the fact that the MSVP and other SVP ('SSVP' hereinbelow) have been set to all the storage systems 20 that constitute the virtual storage system (s406). More specifically, for example, information indicating whether the identifiers of the respective SVP are MSVP identifiers or SSVP identifiers is reported to the respective storage systems 20. The respective storage systems 20 are able to recognize and register their own SVPs as MSVP or SSVP based on this information.

An SSVP that constitutes an MSVP alternate system may be selected from the plurality of SSVP by means of the second method above. That is, the MSVP may be duplicated. In this case, when the MSVP that is operating breaks down, the other SVP that has been selected is able to operate as the MSVP. It is possible to detect from the communications of the INTERSVP recognition programs 811, for example, whether the MSVP has broken down (fault, for example). Further, both in this second method and the abovementioned first method, the number of MSVP operating at the same time is one in the virtual storage system 100. When this one MSVP breaks down, the MSVP of the alternate system is able to operate.

Once the MSVP has been set in either the first or second method, designation by the svp81 is no longer possible and designations are henceforth made by the MSVP. The number management program 102 above may be executed by the MSVP or SVP.

Further, in the case of the second method, if the storage system 20a for which the MSVP has been set is stopped, the MSVP functions are also suspended. Hence, the role of the MSVP must be transferred to the svp81 of another storage system 20. therefore, when the storage system 20 is systematically stopped (that is, when same is stopped intentionally), the fact that the storage system 20 has stopped is reported to the other storage system 20 so that the other storage system 20 is able to recognize the fact that the storage system 20 has stopped. The reporting method at this time may also employ interstorage system communication 44 via the host. When the storage system 20a of the MSVP is systematically stopped, the storage system 20a transmits a message to the effect that same is the MSVP to the other storage systems 20 and sends all the management information managed by the MSVP. The storage system 20 that has received the message sets the svp81 connected to the storage system 20 as the MSVP and stores management information that has been sent in the storage resource of the svp81. Further, in a case where the storage system 20 of the MSVP is stopped abruptly due to a fault or the like, the other storage system 20 communicates with the storage system 20 at fixed intervals in order to be capable of sensing the fact that the storage system 20 has stopped. Once the storage system 20 whose stoppage has been sensed is judged to be the storage system 20a with the MSVP, the SVP connected to the storage system 20 is established as the MSVP. If the storage system 20 obtains management information from the MSVP of the stopped storage system 20a, the storage system 20 extracts the management information and stores the extracted management information in the storage resource of the SVP which is the MSVP. The exchange between the storage systems above may be performed between SVPs.

Furthermore, the respective SSVP transmit the information which has been acquired from the storage system comprising the SSVP and stored to the MSVP together with their own SSVP identifiers. The MSVP setting program associates the received information with the SSVP identifier received with this information and stores the information in the storage resource of the MSVP.

Further, the integration of the SVP, for example, is reported in the MSVP setting report to the respective storage systems.

Furthermore, the storage system management information in which it is written whether the SVP of the storage system is an MSVP and so forth can be managed by the management server 50. The storage system management information is prepared for each storage system. This will be described hereinbelow.

Figure 12A:
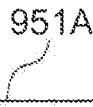
FIG. 12A shows storage system management information for the storage system 20A.
Figure 12B:
FIG. 12B shows storage system management information for the storage system 20D.

FIG. 12a shows the storage system management information for the storage system 20a. FIG. 12b shows the storage system management information for the storage system 20d. The description will be provided hereinbelow with reference to FIG. 12a as a representative example.

Virtual storage system configuration information, storage system information, the virtual storage system number, the SVP number, and the MSVP number, for example, are recorded as the storage system management information 951a.

The 'virtual storage system configuration information' is bit information indicating whether the storage system 20a constitutes the virtual storage system 100. According to FIG. 12a, because the value "yes" is recorded, it can be seen that the storage system 20a constitutes the virtual storage system 100. On the other hand, according to FIG. 12b, because the value "no" is recorded, it can be seen that storage system 20d does not constitute the virtual storage system 100 (that is, the storage system 20d operates independently).

The 'storage system information' is the number of the other storage system 20 constituting the virtual storage system 100. It can be seen from the drawings that one virtual storage system is constituted by the storage systems 20a and 20b.

The 'virtual storage system number' is the number of the virtual storage system 100 of which the storage system 20a is one constituent element.

The 'SVP number' is the identifier of the SVP of the storage system 20a.

The 'MSVP number' is the identifier of the MSVP. When the SVP of the storage system 20a is the MSVP, a number that is the same as the svp number is recorded as the MSVP number. Further, when the storage system 20d operates independently, the same number as the SVP number is recorded as the MSVP number (in this case, the MSVP number may instead be blank).

FIG. 13 shows virtual storage system management information.

One virtual storage system management information item 953 is prepared for each virtual storage system 100. This information is also prepared in the storage resource of the management server 50. The virtual storage system management information 953 is information corresponding with the virtual storage system 100a hereinbelow.

The virtual storage system number, storage system information, MSVP number, and an SVP number list are recorded as the virtual storage system management information 953.

The 'virtual storage system number' is the identifier (number) of the virtual storage system 100a.

The 'storage system information' is a list of identifiers (numbers) of the storage systems 20 constituting the virtual storage system 100a.

The 'MSVP number' is the identifier of the MSVP of the virtual storage system 100a.

The 'SVP number list' is a list of identifiers of the SVP in the virtual storage system 100a. Here, when the SVP integrated management is performed by means of the second method, for example, the same identifier (s20a) as the MSVP identifier is recorded as illustrated. On the other hand, when SVP integrated management is performed by means of the first method, the same identifier as the MSVP identifier is not recorded as the SVP identifier (may be recorded in the same way as the second method).

FIG. 14 shows virtual storage system overall information.

The virtual storage system overall information 955 is stored in the storage resource of the management server 50. This information 955 includes item such as the 'virtual storage system number list' which is the number of all the virtual storage systems constituting the management target of the management server 50. The numbers contained in the 'virtual storage system number list' are added in s601 of FIG. 20, for example.

(c) Fail Over by the Virtual Storage System

The virtual storage system 100 is seen as one system by the host 51. The fail over function is implemented by the virtual storage system 100, for example. Here, the storage system 20b is the alternate system of the storage system 20a. In reality, in order to establish an alternate system by means of LDEV units, the storage system 20a may be the alternate system of the storage system 20b with respect to different LDEV.

FIG. 15 shows fail over management information. More specifically, FIG. 15a shows fail over management information for a LDEV for fail over. On the other hand, FIG. 15b shows fail over management information for an LDEV that is not for fail over.

The fail over management information 957 is stored in the memory 22 of the respective storage systems, for example. The global LDEV number with which the information is associated, the initial active storage system number (the number of the storage system that is initially active), the current active storage system number (the current active storage system number), the current passive storage system number (the current passive storage system number), fail over existence (whether fail over is performed), and the state (whether fail over is in the course of being performed, for example) are recorded as the fail over management information 957. The fail over management information items corresponding with the global LDEV number not for fail over are all blank as shown in FIG. 15b. further, there may be no fail over management information for the LDEV not for fail over.

The storage system 20a of a normal system is called 'active' and the storage system 20b of an alternate system is called 'passive'. Thus, by switching the initiative of the processing from 'active' to 'passive' in the event of a path fault between the storage system 20 and the external storage system 70, and at the time of a planned stoppage of the storage system 20 and a fault of the storage system 20, processing can be continued without affecting the external volume 701.

Furthermore, when a migration of the storage system 20 is performed, the migration function of switching the control right of the external volume 701 between the new and old storage systems 20 can also be implemented by rendering the migration source initially 'active' (path to the external volume is connected) and the migration destination 'passive' and performing processing to switch between active and passive.

The fail over processing between the storage system 20a and storage system 20b will now be described with reference to FIG. 17.

Figure 17:
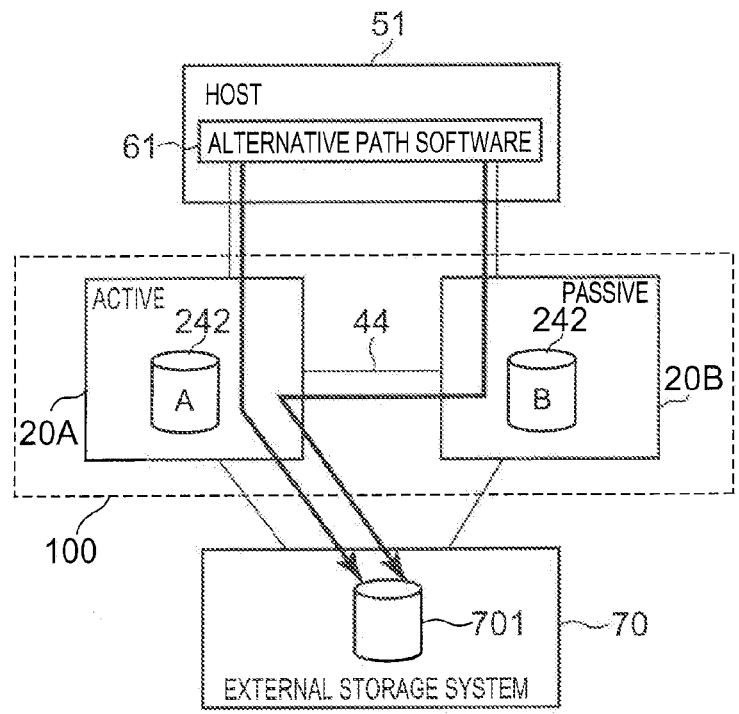
FIG. 17 is an example of the flow of access by the virtual storage system.

FIG. 17 is a simplification of FIG. 1 obtained by extracting the parts associated with the fail over processing. Here, suppose that the external LDEVX in the external storage system 70 is a real unit and the LDEV 240 that correspond with the external LDEVX are virtual devices a and b. Virtual device a is in the storage system 20a, while virtual device b is in the storage system 20b. The virtual devices a and b are connected to the same real unit x and, therefore, the same global LDEV number ('global LDEV number x' hereinbelow) is assigned thereto. Paths are extended from the host 51 to the virtual devices a and b and set as alternate paths by the alternate path software 61. Here, storage system 20a is active and storage system 20b is passive.

An access request in which a global LDEV number x is designated is issued by the host 51 to the storage system 20a or 20b. When the storage system 20a receives the access request, because the storage system 20a is active in the fail over management information 957 that corresponds with the global LDEV number x, the storage system 20a is active and the access request is processed by the storage system 20a. Hence, when the access request is received by the storage system 20b, the storage system 20b transfers the access request from the storage system 20b to 20a via the dedicated line 44. The storage system 20a is able to perform processing without distinguishing whether this is an access request received from the host 51 or an access request received from the storage system 20b.

Here, suppose that a fault occurs in the path between the virtual device a and the external LDEVX. In this case, because there is a fault in the path on the active side, the active and passive roles of the storage systems 20a and 20b which are controller parts for the external LDEVX are switched.

Figure 19:
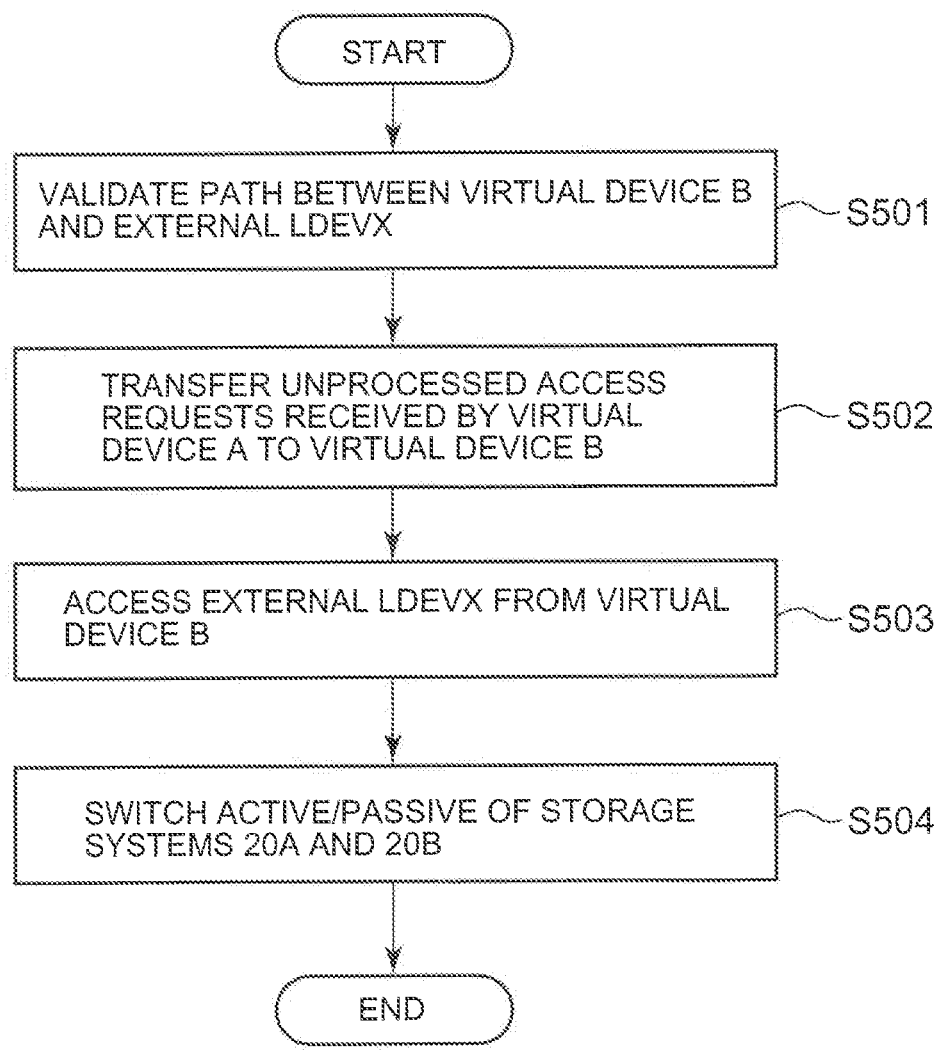
FIG. 19 is an example of the flow of an Active/Passive switch between storage systems.

First, as shown in FIG. 19, the storage system 20b validates the path between virtual device b and the external LDEVX (s501).

On the other hand, the storage system 20a transfers an access request which has already been received by the virtual device a but for which access to the external LDEVX has not been processed to the virtual device b (s502). as a result, the storage system 20b accesses the external LDEVX in accordance with the access request that has been transferred (s503).

Thereafter, the active/passive state of the storage systems 20a and 20b are switched (s504). That is, in the fail over management information corresponding with the global LDEV number x, the current active storage number is at least the number of the storage system 20b and the current passive storage number is at least the number of the storage system 20a.

Figure 18:
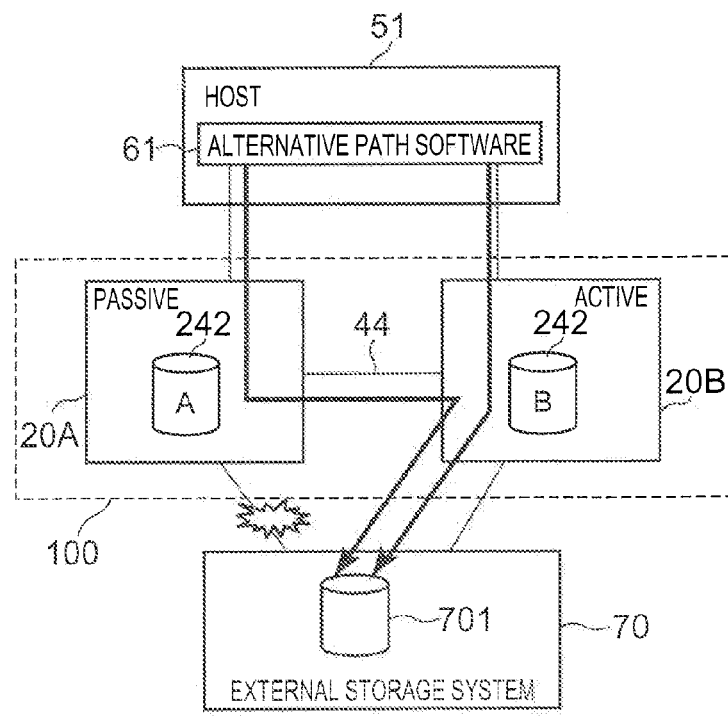
FIG. 18 is an example of the access flow after a fault occurs in the path between the storage system 20A and an external storage system 70 in the system in FIG. 17.

The switching of the active and passive of the storage systems 20a and 20b is completed as detailed above. Thereafter, when the storage system 20b receives the access request that designates the global LDEV number x, the storage system 20b processes the access request as shown in FIG. 18. On the other hand, when the storage system 20a receives the access request, the access request is transferred from the storage system 20a to the storage system 20b via the dedicated line 44.

Thus, in one virtual storage system 100, fail over between storage systems can be implemented.

Further, FIG. 1 is an outband system in which the network for issuing commands from the host 51 to the respective storage systems 20 (san41, 42) and the network (management network 40) whereby the management server 50 sends and receives management information between the storage systems 20 are different. However, this embodiment can also be applied to an inband system. For example, if the constitution is such that the management server 50 sends and receives management information between the respective storage systems 20 via the san41, the system is an inband system.

Although a preferred embodiment of the present invention was described hereinabove, this is an illustrative serving to describe the present invention, there being no intention to limit the scope of the present invention to this embodiment. The present invention can also be implemented in a variety of other forms.

Figure 16:
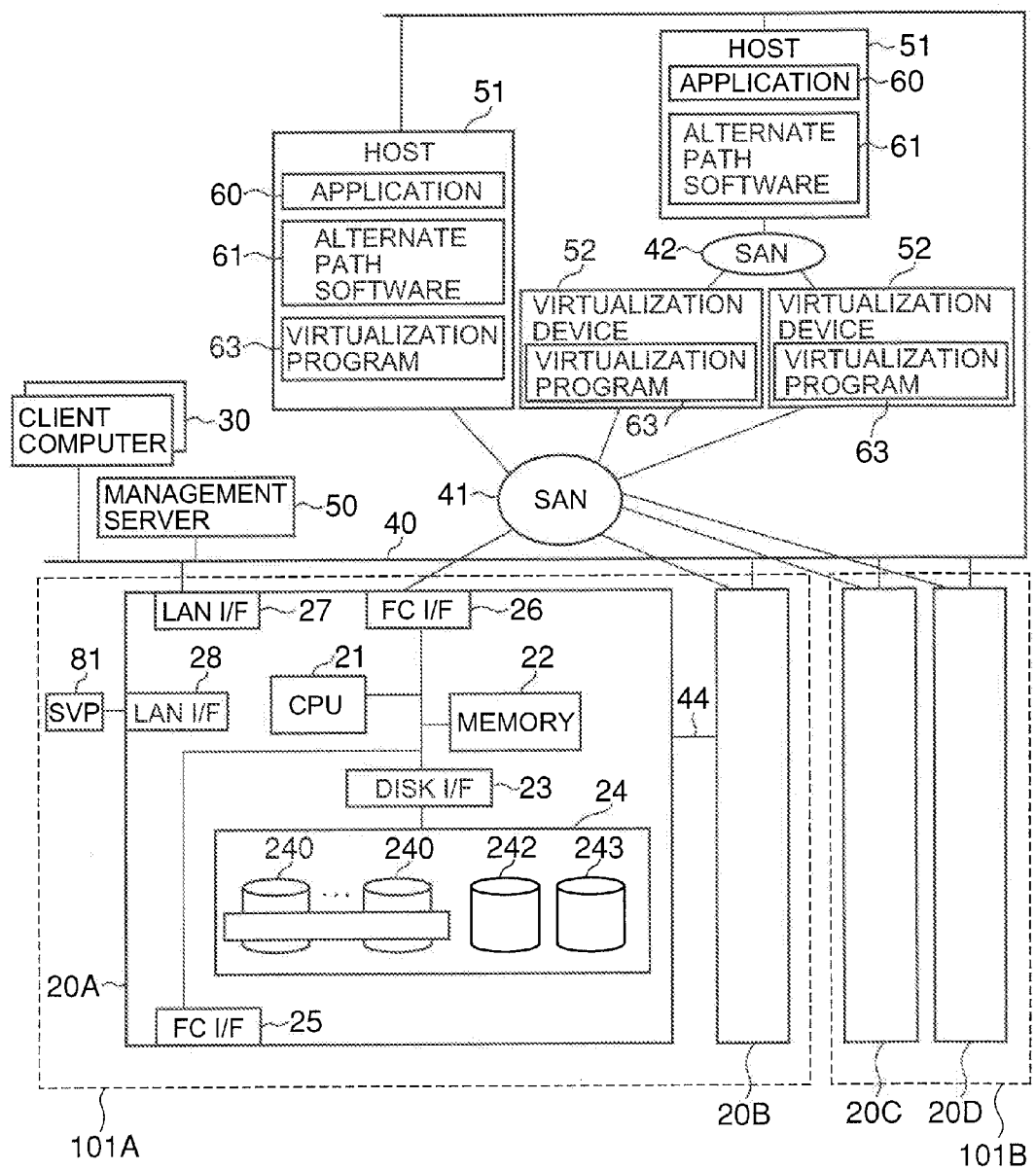
FIG. 16 shows the overall constitution of a system relating to a modified example of this embodiment.

For example, as shown in FIG. 16, the external storage system 70 may be dispensed with. further, in the overall constitution of the system according to the embodiment above, there may be either a mainframe system or an open system or a mixture thereof.

Further, the management through hierarchization is not limited to LDEV numbers, for example. For example, instead of or in addition to LDEV numbers, resource numbers such as the pair numbers and group numbers of the copy system and so forth are hierarchized and can be switched by means of the same method as the LDEV numbers. Heretofore, the resource numbers in the separate storage systems have been one virtual storage system and, therefore, unique numbers are required. For example, the ldev#0 and replication ldev#100 are managed as pair #0 in the storage system 20a. Likewise, the ldev#0 and replication ldev#100 are managed as pair #0 in the storage system 20b. Here, because ldev#0 and #100 are duplicated when the storage systems 20a and 20b are the virtual storage system 100, LDEV numbers must be reset as mentioned earlier. However, the pair number and pair #0 are replicated. Hence, global pair numbers and local pair numbers can be provided in the same way as LDEV numbers. The method of number switching can be similar to the method of switching the LDEV numbers. The processing can be performed in the same way by also providing global group numbers and local group numbers for the group numbers resulting from grouping the copy-system pair numbers.

What is claimed is:

1. A computer system comprising:
a first storage system comprising a first processor and being controlled by the first processor, the first storage system:
   having a first storage system identifier which is associated with a virtual storage system identifier, and being recognized as a virtual storage system by a computer using the virtual storage system identifier, and
   including a plurality of first logical devices associated with a plurality of first logical device numbers which are unique numbers in the first storage system, and a first control device configured to provide a plurality of first global devices associated with a plurality of first global device numbers which are recognized as unique numbers in the virtual storage system by the computer and to manage the plurality of first global device numbers associated with the plurality of first logical devices to provide the computer access to a particular first logical device of the first logical devices by using a particular first global device number of the first global device numbers,
a second storage system comprising a second processor and being controlled by the second processor, the second storage system:
   having a second storage system identifier, and
   including a second control device and a plurality of second logical devices associated with a plurality of second logical device numbers which are unique numbers in the second storage system, the second control device configured to provide a plurality of second global devices associated with a plurality of second global device numbers which are recognized as unique numbers in the virtual storage system by the computer and to manage the plurality of second global device numbers associated with the plurality of second logical devices, and
   while data stored in the particular first logical device of the plurality of first logical devices is migrated to a particular second logical device of the plurality of second logical devices, the second control device associates the second storage system identifier with the virtual storage system identifier associated with the first storage system identifier such that both the first storage system identifier and the second storage system identifier are associated with the virtual storage system identifier at a certain point in time, and
after a completion of data migration from the particular first logical device to the particular second logical device, the first control device releases an association between the virtual storage system identifier and the first storage system identifier and an association between the particular first global device number and a particular first logical device number, of the first logical device numbers, associated with the particular first logical device, whereby the particular first logical device can no longer be accessed by the computer by using the particular first global device number, and the second control device associates the particular first global device number with a particular second logical device number, of the second logical device numbers, associated with the particular second logical device so that the computer recognizes the particular first global device number as a unique logical device number in the virtual storage system by using the virtual storage system identifier and the particular first global device number, and accesses the particular second logical device through the particular first global device number,
   wherein a range in which command transfers and volume migration between respective storage systems, including the first and second storage systems, can be executed is indicated by sending and receiving constitution information between the respective storage systems, and
   wherein when the particular first logical device number is associated with the particular first global device number in the first storage system and the particular second logical device number is associated with the particular first global device number in the second storage system:
   the first control device receives a first access request from the computer and transfers the first access request to the second storage system, and
   the second control device in the second storage system receives the first access request from the first control device and processes the first access request to the particular second logical device.

2. The computer system according to claim 1, wherein when the first control device receives the first access request directed to the particular first global device number in the virtual storage system from the computer, the first control device converts the particular first global device number to the particular second logical device number, and transfers the access request to the second storage system.

3. The computer system according to claim 1, wherein the second control device receives a second access request from the computer and processes the second access request to the particular second logical device.

4. The computer system according to claim 1, wherein when a third storage system, which includes a third control device and a plurality of third logical devices associated with a plurality of third logical device numbers, is added to the virtual storage system,
the virtual storage system identifier is associated with the third storage system.

5. The computer system according to claim 1, wherein the first storage system includes a plurality of first storage drives for storing data, and the plurality of first logical devices are configured on the plurality of first storage drives, and
   wherein the second storage system includes a plurality of second storage drives for storing data, and the plurality of second logical devices are configured on the plurality of second storage drives.

6. The computer system according to claim 5, wherein the plurality of first storage drives are managed as a RAID group and the plurality of second storage drives are managed as a RAID group.

7. A method comprising:
   associating a first storage system identifier of a first storage system with a virtual storage system identifier, the first storage system being recognized as a virtual storage system by a computer using the virtual storage system identifier, and providing a plurality of global devices associated with a plurality of global device numbers which are recognized as unique numbers in the virtual storage system by the computer using the plurality of global device numbers,
   associating a plurality of first logical devices included in the first storage system with a plurality of first logical device numbers which are unique numbers in the first storage system to provide the computer access to a particular first logical device of the first logical devices by using a particular first global device number of the global device numbers, managing, by a first control device of the first storage system, the plurality of global device numbers associated with the plurality of first logical devices, wherein a second storage system includes a second control device and a plurality of second logical devices associated with a plurality of second logical device numbers which are unique numbers in the second storage system, and while data stored in the particular first logical device is migrated to a particular second logical device of the second logical devices, the second control device associates a second storage system identifier of the second storage system with the virtual storage system identifier associated with the first storage system identifier, such that both the first storage system identifier and the second storage system identifier are associated with the virtual storage system identifier at a certain point in time, and after a completion of data migration from the particular first logical device to the particular second logical device, releasing, by the first control device, an association between the virtual storage system identifier and the first storage system identifier and an association between the particular first global device number and a particular first logical device number, of the first logical device numbers, associated with the particular first logical device, whereby the particular first logical device can no longer be accessed by the computer by using the particular first global device number, and associating, by the second control device, the particular first global device number with a particular second logical device number, of the second logical device numbers, associated with the particular second logical device so that the computer recognizes the particular first global device number as a unique logical device number in the virtual storage system by using the virtual storage system identifier and the particular first global device number, and accesses the particular second logical device through the particular first global device number, wherein a range in which command transfers and volume migration between respective storage systems, including the first and second storage systems, can be executed is indicated by sending and receiving constitution information between the respective storage systems, and wherein, when the particular first logical device number is associated with the particular first global device number in the first storage system and the particular second logical device number is associated with the particular first global device number in the second storage system:

receiving, at the first control device, a first access request from the computer and transfers the first access request to the second storage system; and receiving, at the second control device in the second storage system, the first access request from the first control device and processing the first access request to the particular second logical device.

8. The method according to claim 7, wherein, when the first control device receives the first access request directed to the particular first global device number in the virtual storage system from the computer, converting, by the first control device, the particular first global device number to the particular second logical device number, and transferring the access request to the second storage system.

9. The method according to claim 7, further comprising:
receiving, at the second control device, a second access request from the computer and processing the second access request to the particular second logical device.

10. The method according to claim 7, further comprising when a third storage system, which includes a third control device and a plurality of third logical devices associated with a plurality of third logical device numbers, is added to the virtual storage system, associating the virtual storage system identifier with the third storage system.

11. The method according to claim 7, wherein the first storage system includes a plurality of first storage drives for storing data, and the plurality of first logical devices are configured on the plurality of first storage drives, and wherein the second storage system includes a plurality of second storage drives for storing data, and the plurality of second logical devices are configured on the plurality of second storage drives.

12. The method according to claim 11, further comprising:

managing the plurality of first storage drives as a RAID group, and managing the plurality of second storage drives as a RAID group.

13. A computer system comprising:

a server;

a first storage apparatus coupled to the server, the first storage apparatus comprising a first processor and being controlled by the first processor, and having a first storage apparatus identifier, and being configured to provide a first logical device having a first logical device number, the first logical device number being unique in the first storage apparatus; and a second storage apparatus coupled to the server, the second storage apparatus comprising a second processor and being controlled by the second processor, and having a second storage apparatus identifier, and being configured to provide a second logical device having a second logical device number, the second logical device number being unique in the second storage apparatus, the first storage apparatus being configured to provide a virtual storage apparatus identifier, of a virtual storage apparatus, associated with the first storage apparatus identifier and a first virtual logical device number associated with the first logical device number to the server, the first virtual logical device number being unique in the virtual storage apparatus, the server being configured to access a data stored in the first logical device of the first storage apparatus by using the virtual storage apparatus identifier and the first virtual logical device number, when the data stored in the first logical device is migrated to the second logical device, the second storage apparatus associates the second storage apparatus identifier with the virtual storage apparatus identifier associated with the first storage apparatus identifier such that both the first storage apparatus identifier and the second storage apparatus identifier are associated with the virtual storage apparatus identifier at a certain point in time, and after a completion of data migration from the first logical device to the second logical device, the first storage apparatus releases an association between the virtual storage apparatus identifier and the first storage apparatus identifier and an association between the first virtual logical device number and the first logical device number, whereby the first logical device can no longer be accessed by the server by using the first virtual logical device number, and the second storage apparatus associates the second logical device number with the first virtual logical device number previously associated with the first logical device number, wherein a range in which command transfers and volume migration between respective storage apparatuses, including the first and second storage apparatuses, can be executed is indicated by sending and receiving constitution information between the respective storage apparatuses, and wherein when the first logical device number is associated with the first virtual logical device number in the first storage apparatus and the second logical device number is associated with the first virtual logical device number in the second storage apparatus:

the first processor receives a first access request from the server and transfers the first access request to the second storage apparatus, and the second processor in the second storage apparatus receives the first access request from the first processor and processes the first access request to the second logical device.

14. The computer system according to claim 13, wherein the first storage apparatus is further configured to provide a third logical device having a third logical device number, the third logical device number being unique in the first storage apparatus, and provide a second virtual logical device number associated with the third logical device number to the server, the second virtual logical device number being unique in the virtual storage apparatus.

\* \* \* \* \*